(12) United States Patent
Gardyne et al.

(10) Patent No.: US 10,521,847 B2
(45) Date of Patent: Dec. 31, 2019

(54) METHOD FOR PROVIDING OCCASIONAL IN-HOME CARE ADDRESSING TRUST AND SAFETY

(71) Applicant: Oneva, Inc., Oakland, CA (US)

(72) Inventors: Robert Page Gardyne, Oakland, CA (US); Anita Lynne Darden Gardyne, Oakland, CA (US)

(73) Assignee: ONEVA, INC., Oakland, CA (US)

( * ) Notice: Subject to any disclaimer, the term of this patent is extended or adjusted under 35 U.S.C. 154(b) by 0 days.

(21) Appl. No.: 14/724,260

(22) Filed: May 28, 2015

(65) Prior Publication Data

US 2015/0348159 A1 Dec. 3, 2015

Related U.S. Application Data

(60) Provisional application No. 62/004,097, filed on May 28, 2014.

(51) Int. Cl.
*G06Q 30/00* (2012.01)
*G06Q 30/06* (2012.01)
(Continued)

(52) U.S. Cl.
CPC ... *G06Q 30/0625* (2013.01); *G06F 16/24578* (2019.01); *G06F 16/9535* (2019.01);
(Continued)

(58) Field of Classification Search
CPC .................................. G06Q 30/0601–0645
(Continued)

(56) References Cited

U.S. PATENT DOCUMENTS

2006/0036647 A1* 2/2006 Fichtner ............... G06Q 10/10
2007/0257816 A1* 11/2007 Lyle ................ G06Q 30/0251
340/905

(Continued)

FOREIGN PATENT DOCUMENTS

KR     20130035064 A     4/2013

OTHER PUBLICATIONS

Care.com—FAQ's Help for Families; Jul. 11, 2012 (Jul. 11, 2012); accessed via http://web.archive.org/web/20120711030240/http://www.care.com/help-for-families-p1380-q222342.html accessed via archive.org.*
Care.com—How does Care.com work?; Apr. 24, 2013 (Apr. 24, 2013); accessed via http://web.archive.org/web/20130424071904/http://www.care.com/how-it-works-p1008.html accessed via archive.org.*

(Continued)

*Primary Examiner* — Jeffrey A. Smith
*Assistant Examiner* — Allison G Wood
(74) *Attorney, Agent, or Firm* — Wilson Sonsini Goodrich & Rosati

(57) ABSTRACT

Disclosed are systems, media, and methods to provide a coarse qualification process, the coarse qualification process comprising specifying filters and associated ranking characteristics for service providers, the filters comprising at least location, availability, and skills, and resolving practical concerns by displaying candidate service providers based on the filters and ranked based on the ranking characteristics; provide a qualification refinement process, the qualification refinement process comprising modifying the filters and ranking characteristics, applying the refined filters and ranking characteristics, and displaying refined candidate service providers; and provide a service provider booking process, the service provider booking process comprising resolving emotional concerns by viewing service provider video clips, wherein the time to resolve emotional concerns is less than an optimal customer review period, and resolving rational concerns by viewing service provider qualifications.

16 Claims, 10 Drawing Sheets

(51) Int. Cl.
G06F 16/9535 (2019.01)
G06F 16/2457 (2019.01)
(52) U.S. Cl.
CPC ....... *G06Q 30/018* (2013.01); *G06Q 30/0623* (2013.01); *G06Q 30/0629* (2013.01); *G06Q 30/0641* (2013.01)
(58) Field of Classification Search
USPC .............................................. 705/26.1–27.2
See application file for complete search history.

(56) References Cited

U.S. PATENT DOCUMENTS

| | | | |
|---|---|---|---|
| 2008/0313005 A1 | 12/2008 | Nessland et al. | |
| 2011/0137818 A1 | 6/2011 | Goad et al. | |
| 2011/0282793 A1 | 11/2011 | Mercuri et al. | |
| 2012/0221477 A1* | 8/2012 | Pande ................... | G06Q 10/10 705/321 |
| 2013/0226634 A1* | 8/2013 | Jackson ............. | G06Q 30/0605 705/5 |
| 2013/0238461 A1* | 9/2013 | Tieken ................... | G06Q 30/06 705/26.2 |
| 2014/0095339 A1 | 4/2014 | Cooke | |

OTHER PUBLICATIONS

Care.com—Post a Job Today!; Apr. 25, 2013 (Apr. 25, 2013); accessed via http://web.archive.org/web/20130425163336/http://www.care.com/visitor/captureSearchBar.do?care=child-care-babysitter-nanny accessed via archive.org.*

Care.com—FAQ's for Families looking for care; Feb. 29, 2012 (Feb. 29, 2012); accessed via http://web.archive.org/web/20120229122600/http://www.care.com/help-faqs-p1009.html accessed via archive.org.*

Care.com—How does Care.com work?; Jul. 11, 2012 (Jul. 11, 2012); accessed via http://web.archive.org/web/20120711030240/http://www.care.com/help-for-families-p1380-q222342.html accessed via archive.org.*

Care.com—How does Care.com work?; Jul. 10, 2012 (Jul. 10, 2012); accessed via http://web.archive.org/web/20120710041030/http://www.care.com/how-it-works-providers-p1058.html accessed via archive.org.*

Aspinwall, Cary. Sitting pretty: National Web site helps parents find right child care. Dec. 25, 2006 (Dec. 25, 2006). Tulsa World. (Year: 2006).*

PCT/US2015/032928 International Search Report and Written Opinion dated Aug. 25, 2015.

* cited by examiner

METHOD FOR PROVIDING OCCASIONAL IN-HOME CARE ADDRESSING TRUST AND SAFETY

CROSS-REFERENCE TO RELATED APPLICATIONS

This application claims the benefit of U.S. Application Ser. No. 62/004,097, filed May 28, 2014, which is incorporated by reference in its entirety.

BACKGROUND OF THE INVENTION

New offerings in the service provider marketplace allow customers to receive numerous services from small and large suppliers using desktop or mobile applications or websites. Different types of service require different levels of trust on the part of the customer. Available service providers with valuable or uncommon qualifications, including locality and ability, may not meet customer trust requirements. Transactions to acquire products from previously unknown suppliers benefit from immediate establishment of trust prior to the transaction.

SUMMARY OF THE INVENTION

Current offerings are insufficient to allow a customer to resolve practical, rational and emotional concerns required to engage a new service provider in the execution of requested duties on or for persons or property of valuable or irreplaceable nature. Current offerings are also insufficient to allow a customer to resolve practical, rational, and emotional concerns required to engage a new and previously unknown supplier of a required product.

Practical concerns over the shortcomings of current technologies involve the challenges (excessive time and effort) in finding, vetting, and scheduling a service provider or determining product availability. Rational challenges include a means of resolving qualifications sufficient to understand the proper fit between the service provider or product and the client (such as servicing the right model of dishwasher). Emotional challenges involve the need to satisfy the intuitive judgment of the customer that the service provider or product is trustworthy and safe—a place where first impressions count.

Many of these services occur on inanimate objects in the home in the presence of the client. Well known services allow, for example, a homeowner to find a handyman to assemble a desk or to find numerous washing machine repair technicians. These services rely on the customer to accept without any validation that these individuals can be trusted to work in the client's home. The ongoing presence of an adult customer in the home during the service mitigates some of the trust concerns. However, many adults are still uneasy when having service people work on appliances in their home even in their presence, demonstrating this concern by constantly monitoring the service person while in their home. The primary concern driving following the service provider in the accomplishment of duties is often focused on assuring that valuables, pets, children, and elders are not alone with the unknown service personnel for even a minute. Most customers requiring in-home appliance service can satisfy practical concerns for booking an appointment and establishing sufficient qualifications in a phone call, but emotional concerns about safety are left unanswered. Accordingly, most potential customers avoid service personnel in their home unless there is an emergency (broken washing machine) due to the lack of resolution of the emotional challenge (satisfying emotional concerns about trust and safety).

A specific type of service industry, the occasional in-home care industry known by previous generations as babysitting, best illustrates the problem of resolving practical, rational and emotional concerns for service for or around persons or property of valuable or irreplaceable nature. Occasional in-home care, which now represents a broader category including elder care, relied in the 1960s, 1970s, and 1980s on the teenage sons and daughters of friends and colleagues in the immediate neighborhood to babysit their young children. Teenage boys and girls, the service providers, abounded in the neighborhood, everybody knew their neighbors and bookings were done over coffee or over the fence, and teenage girls were considered to be trustworthy as a class. No serious practical, rational or emotional concerns were unresolved.

By the 1990s, changes in society significantly increased the challenges for customers seeking in-home care. More women were working and more families relied on two income families (driving up the need for babysitters). People no longer knew their neighbors, and fewer teenagers were around as the baby boom subsided. Parents no longer had friends with teenage children of suitable character to watch their children. The advent of the Internet in the 1990s spawned the creation of on-line companies that attempted to fill the void by allowing a customer, for a subscription or per-use fee, to use a website to locate sitters in their neighborhood. The process of booking a service provider, such as an occasional in-home caregiver or sitter, was largely focused on and the responsibility of the customer. The customer had to typically perform a large number of steps to a book a sitter: 1) subscribe to a sitting service company by entering a customer credit card over the Internet; 2) look through lists of sitters and pick several candidates to evaluate based on a text description; 3) call each sitter and get their qualifications, references and availability; 4) call the sitters' references (which would probably not be objective); 5) call the sitter back to book the event, 6) on the day of the event, tell the sitter all of the requirements for the person under care; and 7) pay with cash at the end of the visit. Even with all the work on the part of the customer, very little objective verification of the caregiver's qualification, experience, or criminal history occurred. Serious unresolved practical, rational and emotional concerns limited the market and reach of the early Internet-based care providers.

The advent of mobile devices since 2000 has done little to change the paradigm of heavy customer responsibility of the 1990s. Accessing the list of caregivers is now easier on mobile devices such as a smart phone, and the service providers now display one or more photographs and text describing qualifications in their own words. Some care providers provide trust ratings with proprietary levels of trust and unknown value to the customer. Videos of caregivers are hard to find or non-existent and video interviews unheard of. The customer still has to confirm availability, select a caregiver based on limited and arbitrary information, and book the event directly with the caregiver. In the current mode of operation for mobile and desktop accessible service providers, the limited information available to the consumer is insufficient to appeal to the practical need to book a service, the rational need to evaluate meaningful qualifications, and the emotional need to establish trust sufficient to overcome the reluctance to book an in-home care provider.

A second specific type of service industry, appliance repair, well illustrates the problem of resolving practical, rational, and emotional concerns for service for or around persons or property of valuable or irreplaceable nature when trust resources cannot be met by the primary service provider. For some services and in some locations and at some times, the limited pool of service providers may not allow the customer to locate any service provider that meets practical (e.g., scheduling, etc.) and rational requirements (e.g., qualifications, etc.) and meets emotional requirements for trust and safety. A service provider, such as a washing machine repairperson or a plumber, may require unfettered travel between the in-home repair site and a service vehicle, necessitating frequent trips past master and children's bedrooms, where people and property of valuable and irreplaceable nature may be unsupervised. The presence of a service provider in the customer home that does not meet emotional requirements for trust and safety requires the ongoing presence and active supervision of the customer and inhibits the transaction from occurring.

Many products require the establishment of some level of trust with the supplier prior to a customer purchase. For small businesses without a familiar brand, the trust issues about the small business and small business owner must resolved before even a simple product without trust ramifications can be purchased. The purchase of a ream of paper from a specialty paper company best illustrates the problem of resolving practical, rational and emotional concerns for purchasing a product from a previously unknown supplier. For some products and in some locations, the limited pool of suppliers may not allow the customer to locate a required product from a known and trusted supplier. Many customers will not start, or fail to complete, transactions with a new and unknown supplier because of unresolved emotional concerns about being a victim of poor product or financial malfeasance. Both the customer needing a product and the supplier having the necessary product are unsatisfied because the customer cannot establish a sufficient level of trust in a new supplier to engage in and complete a transaction.

The concerns challenging the customer in finding trustworthy service providers and product suppliers today are pertinent across a broad number of potential applications as more and different services and more service providers of many types are available via the Internet. The physical proximity of children, elders, the sick or infirm, or valuable or irreplaceable property to other required services in the home make the emotional challenge of judging trust and safety critical in most in-home service requests, whether the service is for people or property.

The judgment of trustworthiness and safety by the customer is complex, but as with job interviews, first impressions and non-verbal communications are critical components of engaging in a personal relationship and generating as sense of trust. All practical, emotional, and rational concerns for a service provider are best resolved within a very short period of time if a customer is to book an in-house service provider where there are valuable or irreplaceable persons or property.

It would seem simple to augment existing Internet-based service and product providers to add a trust rating system to satisfy the rational component and a video clip of the client to attempt to satisfy the rational component, but such efforts are problematic. Relevant certifications are absent or proprietary and cryptic. If video is available at all, it is accessed through a link somewhere among the qualifications and experience. The time to make a good first impression that can establish the foundation for trust passes as the customer is presented with a deluge of qualifications in text. While a photograph establishes eye contact briefly, the unchanged image of a photograph over time does not satisfy the need for an emotional connection that occurs with a dynamic presentation of that person in a video clip.

The problem to be solved in the resolution of practical, rational and emotional concerns required to engage a new service provider or product supplier in the execution of requested duties on or for persons or property of valuable or irreplaceable nature is to simultaneously or nearly so: 1) resolve practical concerns by offering only candidates who are available for hire at the required date and time; 2) resolve emotional concerns of trust and safety with video technology in the initial review period (for example 10, 15, 20, 25, 30, 35, 40, or 45 seconds) that allows the customer to perceive appropriate virtues through dynamic characteristics—appearance, voice, other non-verbal communications such as eye contact; and 3) resolve rational concerns through establishment of consistent and reputable credentials for suitability for employment or use during the same initial period.

In one aspect, disclosed herein are computer-implemented systems comprising: a digital processing device comprising an operating system configured to perform executable instructions and a memory; a computer program including instructions executable by the digital processing device to create an application for selecting and engaging a new in-home care service provider, the application comprising: a software module configured to provide a coarse qualification process, the coarse qualification process comprising specifying filters and associated ranking characteristics for service providers, the filters comprising at least location, availability, and skills, and resolving practical concerns by displaying candidate service providers based on the filters and ranked based on the ranking characteristics; a software module configured to provide a qualification refinement process, the qualification refinement process comprising modifying the filters and ranking characteristics, applying the refined filters and ranking characteristics, and displaying refined candidate service providers; and a software module configured to provide a service provider booking process, the service provider booking process comprising resolving emotional concerns by viewing service provider video clips, wherein the time to resolve emotional concerns is less than an optimal customer review period, and resolving rational concerns by viewing service provider qualifications. In some embodiments, the skills comprise fluency in a specified language. In some embodiments, the software module configured to provide a service provider booking process creates a contractual commitment between the service provider and a customer. In some embodiments, the qualifications comprise experience, certifications, licenses, or references.

In another aspect, disclosed herein are non-transitory computer-readable storage media encoded with a computer program including instructions executable by a processor to create an application for selecting and engaging a new in-home care service provider, the application comprising: a software module configured to provide a coarse qualification process, the coarse qualification process comprising specifying filters and associated ranking characteristics for service providers, the filters comprising at least location, availability, and skills, and resolving practical concerns by displaying candidate service providers based on the filters and ranked based on the ranking characteristics; a software module configured to provide a qualification refinement process, the qualification refinement process comprising modifying the filters and ranking characteristics, applying the refined filters and ranking characteristics, and displaying refined candidate service providers; and a software module configured to provide a service provider booking process, the service provider booking process comprising resolving emotional concerns by viewing service provider video clips, wherein the time to resolve emotional concerns is less than an optimal customer review period, and resolving rational concerns by viewing service provider qualifications. In some embodiments, the skills comprise fluency in a specified language. In some embodiments, the software module configured to provide a service provider booking process creates a contractual commitment between the service provider and a customer. In some embodiments, the qualifications comprise experience, certifications, licenses, or references.

In another aspect, disclosed herein are computer-implemented methods for selecting and engaging a new in-home care service provider, the method comprising: providing, by a computer, a coarse qualification process, the coarse qualification process comprising specifying filters and associated ranking characteristics for service providers, the filters comprising at least location, availability, and skills, and resolving practical concerns by displaying candidate service providers based on the filters and ranked based on the ranking characteristics; providing, by the computer, a qualification refinement process, the qualification refinement process comprising modifying the filters and ranking characteristics, applying the refined filters and ranking characteristics, and displaying refined candidate service providers; and providing, by the computer, a service provider booking process, the service provider booking process comprising resolving emotional concerns by viewing service provider video clips, wherein the time to resolve emotional concerns is less than an optimal customer review period, and resolving rational concerns by viewing service provider qualifications. In some embodiments, the skills comprise fluency in a specified language. In some embodiments, the service provider booking process creates a contractual commitment between the service provider and a customer. In some embodiments, the qualifications comprise experience, certifications, licenses, or references.

DETAILED DESCRIPTION OF THE INVENTION

Figure 1:
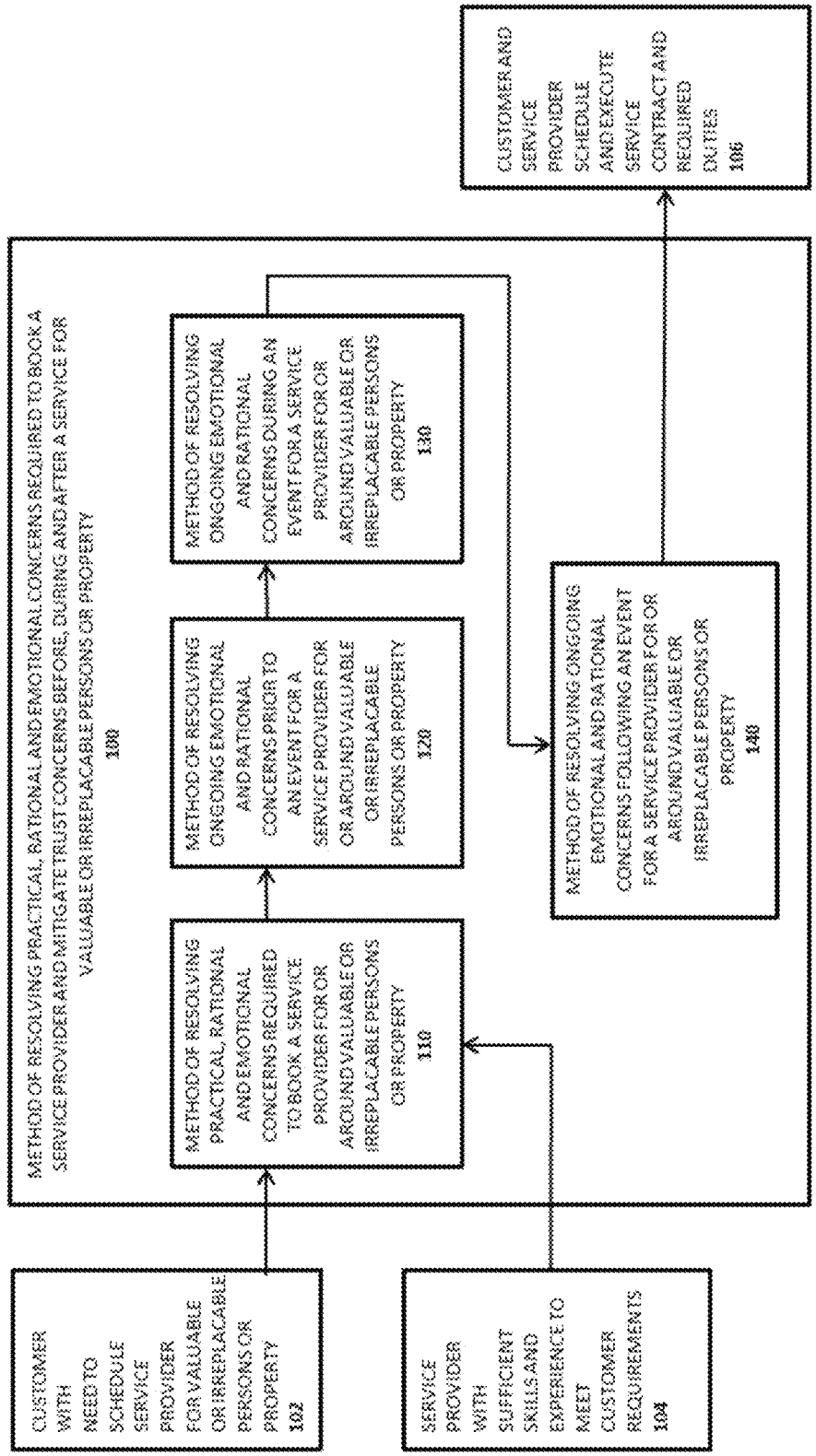
FIG. 1 shows a non-limiting example of a process flow diagram; in this case, a process for resolving practical, emotional, and rational client concerns for booking a service provider and before, during, and after the service event.

Described herein, in certain embodiments, are computer-implemented systems comprising: a digital processing device comprising an operating system configured to perform executable instructions and a memory; a computer program including instructions executable by the digital processing device to create an application for selecting and engaging a new in-home care service provider, the application comprising: a software module configured to provide a coarse qualification process, the coarse qualification process comprising specifying filters and associated ranking characteristics for service providers, the filters comprising at least location, availability, and skills, and resolving practical concerns by displaying candidate service providers based on the filters and ranked based on the ranking characteristics; a software module configured to provide a qualification refinement process, the qualification refinement process comprising modifying the filters and ranking characteristics, applying the refined filters and ranking characteristics, and displaying refined candidate service providers; and a software module configured to provide a service provider booking process, the service provider booking process comprising resolving emotional concerns by viewing service provider video clips, wherein the time to resolve emotional concerns is less than an optimal customer review period, and resolving rational concerns by viewing service provider qualifications.

Also described herein, in certain embodiments, are non-transitory computer-readable storage media encoded with a computer program including instructions executable by a processor to create an application for selecting and engaging a new in-home care service provider, the application comprising: a software module configured to provide a coarse qualification process, the coarse qualification process comprising specifying filters and associated ranking characteristics for service providers, the filters comprising at least location, availability, and skills, and resolving practical concerns by displaying candidate service providers based on the filters and ranked based on the ranking characteristics; a software module configured to provide a qualification refinement process, the qualification refinement process comprising modifying the filters and ranking characteristics, applying the refined filters and ranking characteristics, and displaying refined candidate service providers; and a software module configured to provide a service provider booking process, the service provider booking process comprising resolving emotional concerns by viewing service provider video clips, wherein the time to resolve emotional concerns is less than an optimal customer review period, and resolving rational concerns by viewing service provider qualifications.

Also described herein, in certain embodiments, are computer-implemented methods for selecting and engaging a new in-home care service provider, the method comprising: providing, by a computer, a coarse qualification process, the coarse qualification process comprising specifying filters and associated ranking characteristics for service providers, the filters comprising at least location, availability, and skills, and resolving practical concerns by displaying candidate service providers based on the filters and ranked based on the ranking characteristics; providing, by the computer, a qualification refinement process, the qualification refinement process comprising modifying the filters and ranking characteristics, applying the refined filters and ranking characteristics, and displaying refined candidate service providers; and providing, by the computer, a service provider booking process, the service provider booking process comprising resolving emotional concerns by viewing service provider video clips, wherein the time to resolve emotional concerns is less than an optimal customer review period, and resolving rational concerns by viewing service provider qualifications.

Certain Definitions

Unless otherwise defined, all technical terms used herein have the same meaning as commonly understood by one of ordinary skill in the art to which this invention belongs. As used in this specification and the appended claims, the singular forms "a," "an," and "the" include plural references unless the context clearly dictates otherwise. Any reference to "or" herein is intended to encompass "and/or" unless otherwise stated.

Overview

The systems, media, and methods described herein provide a means of using software technology, web site technology, and live streaming and recorded video to resolve practical, rational and emotional concerns in a near simultaneous manner so as to allow a customer to decide to trust and engage a new service provider in the execution of requested duties on or for or in physical proximity to persons or property of valuable or irreplaceable nature, hereafter known as "trusted duties."

The invention applies to a single individual service provider or supplier, or service providers or suppliers operating collectively and representing themselves to customers, or service providers or suppliers operating through one or more agents or agencies, with service providers or suppliers within a group having either similar or disparate services or offerings. The invention also applies to the establishment of trust with a new previously unknown supplier where trust and emotional concerns may dominate the decision making process to start and complete the purchase.

As described herein, the software technology, web site technology, and live streaming and recorded video may be rendered on known platforms such as Internet-connected desktop computers, laptops, smart phones and tablets, as well as emerging technology such as web-enabled television and video-capable smart watches—this invention also applies to all future technology capable of two-way communications to Internet servers and capable of the display or live streaming and/or recorded video content.

The systems, media, and methods described herein resolve three types of concerns—practical, rational, and emotional—as follows. The systems, media, and methods described herein resolve practical concerns by eliminating the challenges (excessive time and effort) in finding, vetting and scheduling a service provider or product supplier. The systems, media, and methods described herein resolve rational concerns by providing a means of resolving qualifications sufficient to understand the proper fit between the service provider's skills and experience, or product specifications, and client requirements. The systems, media, and methods described herein resolve emotional challenges to satisfy the intuitive judgment of the customer that the service provider or product supplier is trustworthy and safe within a limited timeframe, and provides reinforcement for the initial resolution of emotional concerns prior to and during the service event or product purchase. Critically, the systems, media, and methods described herein resolve all three concerns in a limited period of time—the optimal customer review period—when the customer makes a first impression. While the optimal review period varies depending on the nature of the task, for example here, 30 seconds. Finally, the systems, media, and methods described herein provide means to reinforce the initial decision to trust the service provider being scheduled during and after the event.

Referring to FIG. 1, the subject matter described herein 100, in some embodiments, is for resolving practical, emotional and rational client concerns for booking a service provider before, during and after the service event. The instant subject matter includes a method of initially resolving practical, rational and emotional concerns between a customer 102 and a service provider 104 during the initial booking and scheduling method when a contract between the customer and service provider is let, and subsequently resolving ongoing customer rational and emotional concerns through the period before the service event, during the service event, and following the service event.

For the purpose of this disclosure, a service provider who has resolved for a specific customer all necessary practical, rational and emotional concerns required to book or contract a service for or around valuable or irreplaceable persons or property is a "trusted service provider."

In some embodiments, the subject matter described herein includes systems, media, and methods for resolving practical, rational, and emotional concerns required to book a service provider for or around valuable or irreplaceable persons or property 110 for initially resolving practical, rational and emotional concerns that customer 102 has about service provider 104 leading to the customer booking an event, a contractual commitment, with a service provider.

In some embodiments, the subject matter described herein optionally includes systems, media, and methods for resolving ongoing rational and emotional concerns prior to an event for a service provider for or around valuable or irreplaceable persons or property 120 that reinforces the rational and emotional resolution of customer 102 concerns with the service provider 104 after the event has been scheduled but before the service event has occurred. Method 120 includes but is not limited to: scheduled or non-scheduled live video interviews, conversations or chats between the customer and service provider; scheduled or non-scheduled live audio interviews, conversations or chats between the customer and service provider; the presentation of additional recorded video clips, blogs or podcasts from the service provider or company staff or representatives to the customer which may be directed specifically at one or more customers; or other customer-specific communications from the service provider to the customer using the customer's previously specified preferred form or mode of communication.

In some embodiments, the subject matter described herein optionally includes systems, media, and methods for resolving ongoing rational and emotional concerns during an event for a service provider for or around valuable or irreplaceable persons or property 130 that reinforces the rational and emotional resolution of customer 102 concerns with the service provider 104 during the service event. Method 130 includes but is not limited to: scheduled or non-scheduled live video interviews, conversations or chats between the customer and service provider or customer and company staff or representatives; or other customer-specific communications from the service provider to the customer using the customer's previously specified preferred form or mode of communication.

In some embodiments, the subject matter described herein optionally includes systems, media, and methods for resolving ongoing rational and emotional concerns after an event for a service provider for or around valuable or irreplaceable persons or property 140 that reinforces the rational and emotional resolution of customer 102 concerns with the service provider 104 after the service event has concluded. Method 140 includes but is not limited to: scheduled or non-scheduled live video interviews, conversations or chats between the customer and service provider; scheduled or non-scheduled live audio interviews, conversations or chats between the customer and service provider; the presentation of additional recorded video clips, blogs or podcasts from the service event itself; or other customer-specific communications from the service provider to the customer using the customer's previously specified preferred form or mode of communication.

Method of Booking a Service Provider

Figure 2:
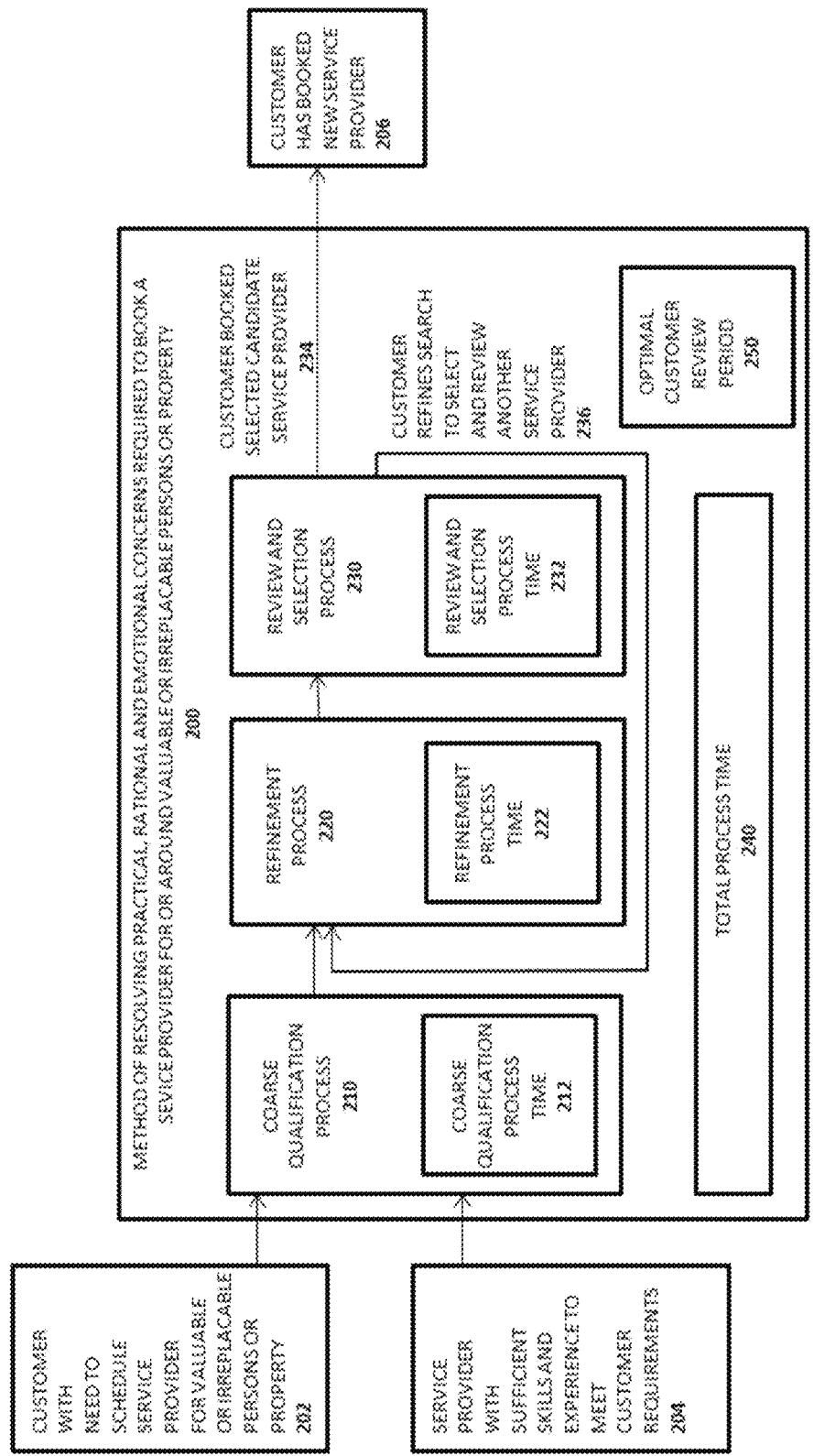
FIG. 2 shows a non-limiting example of a process flow diagram; in this case, a process for resolving practical, emotional, and rational client concerns required to book a service provider for or around valuable or irreplaceable persons or property.

Referring to FIG. 2, the method of resolving practical, emotional and rational client concerns for booking a service provider for or around valuable or irreplaceable persons or property 200 (here known as "method of booking a service"): method of resolving practical, emotional and rational client concerns for booking a service provider results in the resolution of practical, rational and emotional concerns required for customer 202 to book, or engage in a contract to perform work for pay, Service Provider 204. The invention specifies the resolution of all of these three concerns by customer 202 about service provider 204 in a near simultaneous manner and within the period of time in which a first impression is made, the optimal customer review period 250, which in various embodiments, is about 3, 2, or 1 minute or less, or about 60, 50, 40, 30, 20, or 10 seconds or less.

Method of booking a service 200 includes a coarse qualifications process 210 which allows the customer 202 to specify filtering and ranking characteristics to view a ranked display of service providers and their characteristics who meet customer-specified requirements for availability and skills. Coarse qualifications process time 212 is the period of time required to perform coarse qualifications process 210.

Following the coarse qualifications process 210, method of booking a service 200 includes refinement process 220, which allows the customer 202 to modify filtering and ranking characteristics to enhance their pool of available service provider candidates that meet their requirements. Refinement process time 222 is the period of time required to perform refinement process 220.

Figure 5:
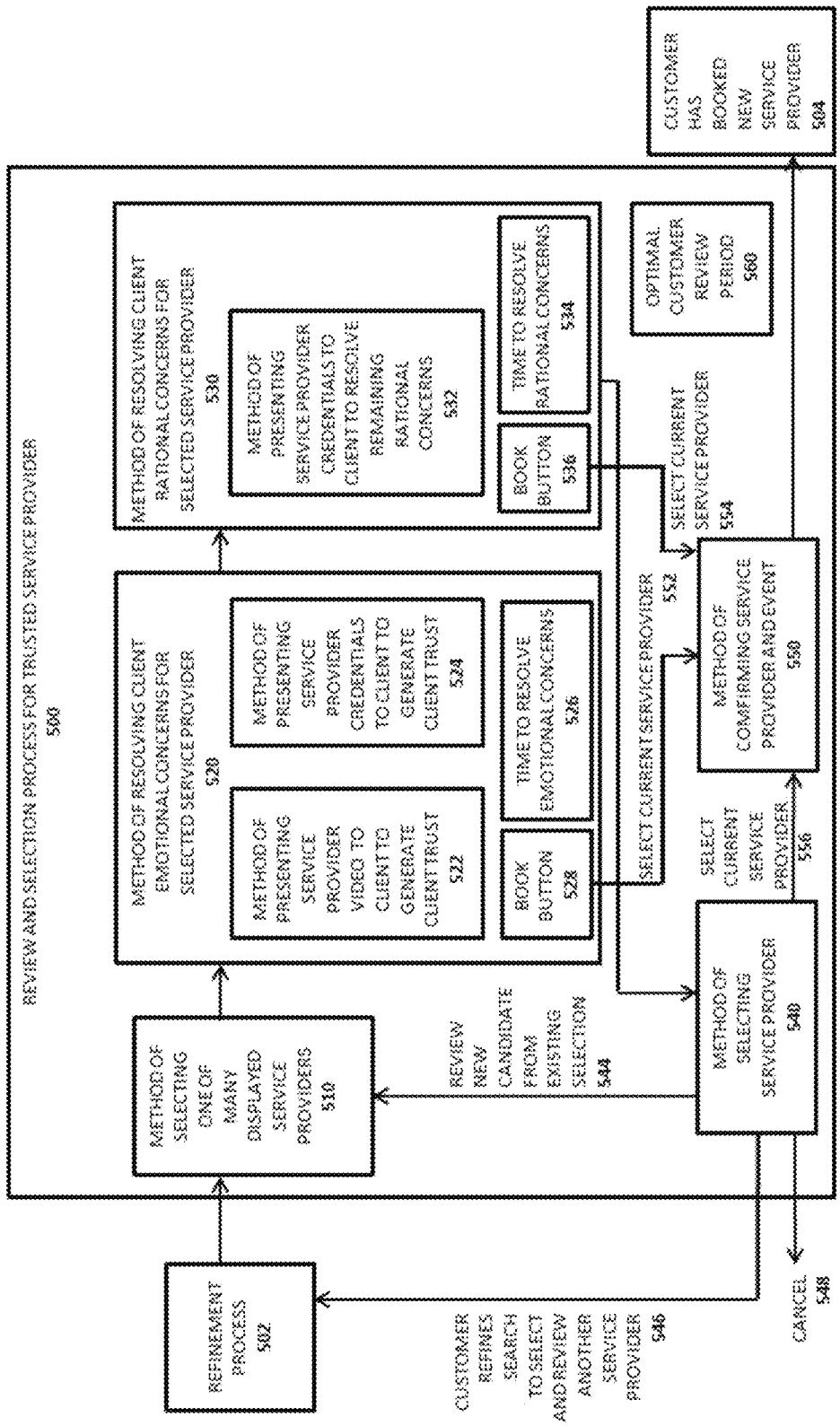
FIG. 5 shows a non-limiting example of a process flow diagram; in this case, a process for review and selection of trusted service providers.

Following the refinement process 220, method of booking a service 200 includes review and selection process 230, which allows the customer 202 to select one potential service provider to review at a time, to review that service provider's video clip(s) and associated picture or text data that resolve emotional and rational concerns, and to choose to do one of the following actions: 1) select the current candidate service provider for a booking by following path customer booked selected candidate service provider 234; 2) go back to the start of review and selection process 230 (this path is shown in FIG. 5—review and selection process for trusted caregiver); 3) go back to the start of refinement process 220 by following path customer refines search to select and review another service provider 236; or 4) cancel the selection effort (not shown). If the customer selects the current candidate service provider for a booking, method of confirming event 550 confirms critical event parameters with the customer, makes changes as required to satisfy the customer, and culminates in a contract between the customer 202 and service provider 204 for payment in exchange for goods or services. Critical event parameters may include, but are not limited to: the service provider, location, date and time of the event, any other customer-identified critical requirements, initial invoice, and deposit. Review and selection process time 232 is the period of time required to perform review and selection process 230.

The total process time 240 is the sum of coarse qualifications process time 212, refinement process time 222, and review and selection process time 230. While it is desirable for the overall total process time 240 to be less than or equal to optimal customer review period 250, the review and selection process time 230 must be less than or equal to optimal customer review period 250.

Coarse Qualification Process

Figure 3:
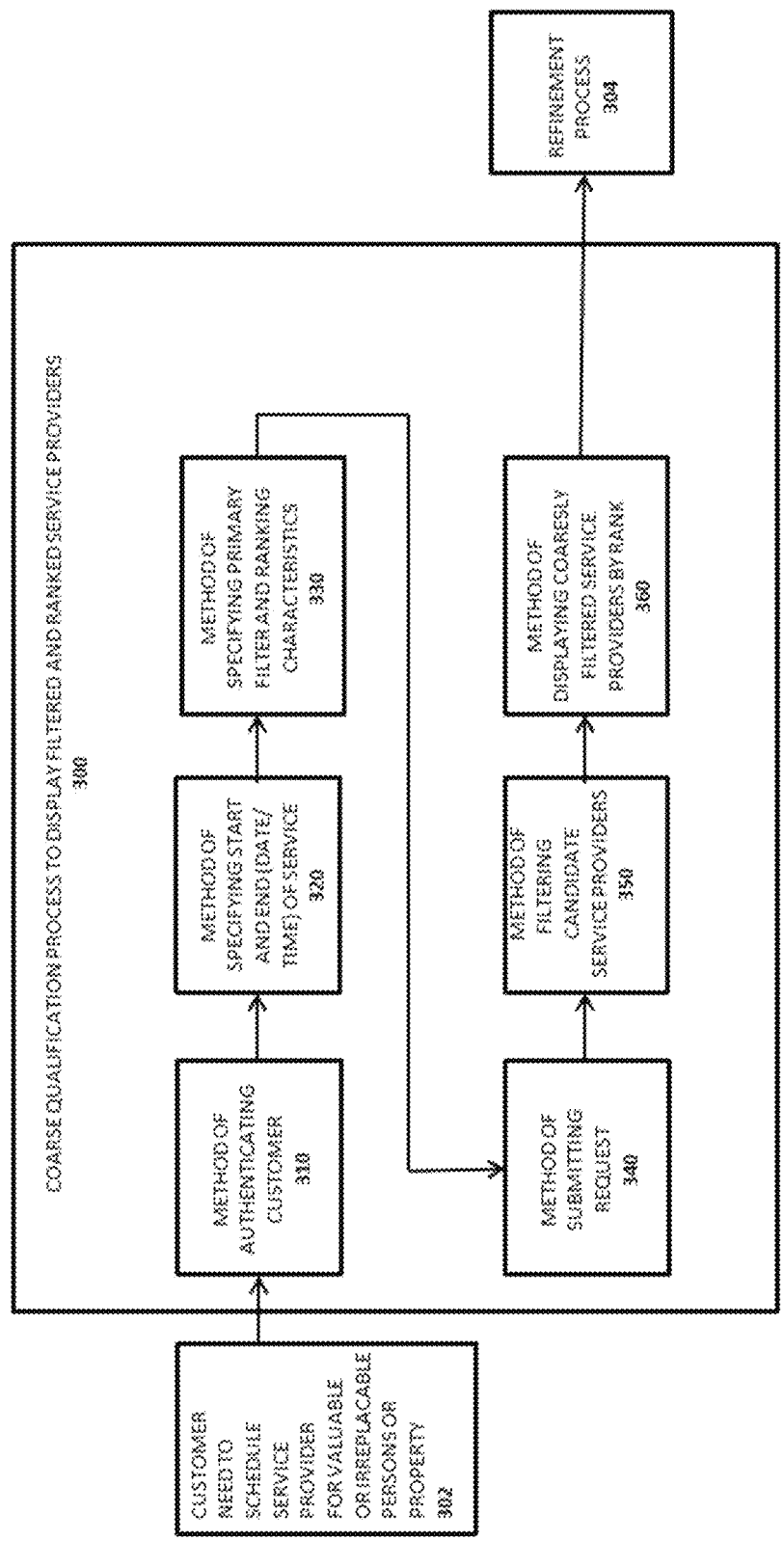
FIG. 3 shows a non-limiting example of a process flow diagram; in this case, a process for coarse qualification of a trusted service provider.

Referring to FIG. 3, the coarse qualifications process to display filtered and ranked service providers 300—coarse qualification of a trusted service provider is comprised of method of authenticating customer 310 to authenticate the customer 302 to allow access to secure data 310, a method of specifying a required date and time 320, a method of specifying primary filter and ranking characteristics 330, a method of submitting the request 340, a method of filtering and ranking candidate service providers 350, and a method of displaying coarsely filtered and ranked service providers 360.

Method of authenticating customer 310 is required to allow access to private or secure data, such as service provider phone number. This method is comprised of a number of alternatives commonly known to practitioners of the art, including username and password, fingerprint scanners, biometrics, retina patterns, and other identification and authentication means not yet devised. The invention has been reduced to practice with a login dialogue box requiring an approved username and password.

Method of specifying start and end (date/time) of service 320 allows the customer to specify a required date and time for the service event. The method is comprised of a number of alternatives commonly known to practitioners of the art, including text field, month/date/time selectors, and other methods not described for start date, start time of day, end date and end time of day; and start date, start time of day and duration. One or more events or a series of events or a long duration continuous event (over a 24-hour duration) may be specified. Times may be entered in a variety of formats. The invention has been reduced to practice with selection field for a single service event with each of start date, start time of day, end date and end time of day.

The method of specifying primary filter and ranking characteristics 330 specifies additional critical characteristics used to filter and rank the candidate service providers. Method 330 is comprised of customer input in the form of free text, guided text, selectors of predetermined alternatives including radio button (only one of many), additive (check all that apply), and other methods of entering or selecting text keywords. Text for filters or ranking characteristics can be entered in a variety of methods, including keyboard with or without predictive spelling, or voice recognition. The invention has been reduced to practice with text field for keyword matches, pull-down menus for regions, and a selector to display service providers in A-Z or Z-A alphabetical order.

The method of submitting request 340 is comprised of depressing a button on the website or application, or entering a value in a final field, or having entered values in all required fields, or any other common alternative that indicates an active customer request. The invention has been reduced to practice with a button on a website that indicates the customer's request to book a service provider that can only be depressed by a logged-in and authenticated customer who has used method of authenticating customer 310.

The method of filtering candidate service providers 350 uses the customer-specified start and end date/time from method 320 and primary filter characteristics from method 330 to select certain service providers from the set of all known service providers. Primary filter characteristics from method 330 used in method 350 typically include key pass/fail requirements that can be answered with a clear yes or no answer, such as:

Is the client in the service provider's service area?

Does the service provider possess specific required skills, such as the foreign language Spanish?

All service providers that are available at the required date and time and available for the necessary duration, and meeting all of the customer-specified required (filter) characteristics, such as location or language requirements, are known here as candidate service providers. All candidate service providers resolve the practical concerns of the customer by virtue of being available at the specified time and having all specific required skills. The output of method 350 is a list or set of candidate service providers who meet the practical availability requirement from 320 and fulfill all critical filter characteristics from 330 needed to satisfy fully the practical part of the client's concerns. The set of candidate service providers can be null (no members) if service date/time/location or other specific customer needs eliminate all available service providers.

The method of displaying coarsely filtered service providers by rank 360 concurrently displays N selected candidate service providers from method 350 according to customer-specified ranking characteristics from method 330, where N may be zero or any number of service providers up to a maximum useful simultaneous review count determined by display size and user environment. N may be zero if method 350 output was a null set and no service providers met service date/time/location requirements or other critical specific customer requirements. If any service providers match requirements, one or many service providers may be candidate service providers, but the number N to view at one time is optimally four to nine service providers. One or more different ranking characteristics from method 330 may applied, where ranking characteristics are used to sort the display of service providers in order of their degree of match against the specified ranking characteristics.

In the method of displaying coarsely filtered service providers by rank 360, if the number of displayable service providers is larger than the number that can be simultaneously viewed, additional service providers after the first viewable set can be viewed by paging through successive pages of viewable service providers using standard paging techniques known in the industry such as page number lists with up and down arrows, lists of all pages by index. The output of method 360 is a display of N service providers, known to be available at date and time specified by method 320, further selected using filter characteristics, such as region and language, specified by method 330, and sorted by ranking characteristics, such as years of experience, specified by method 330, such that additional qualified candidate service providers can be viewed N at a time until all have been viewed.

Refinement Process

Figure 4:
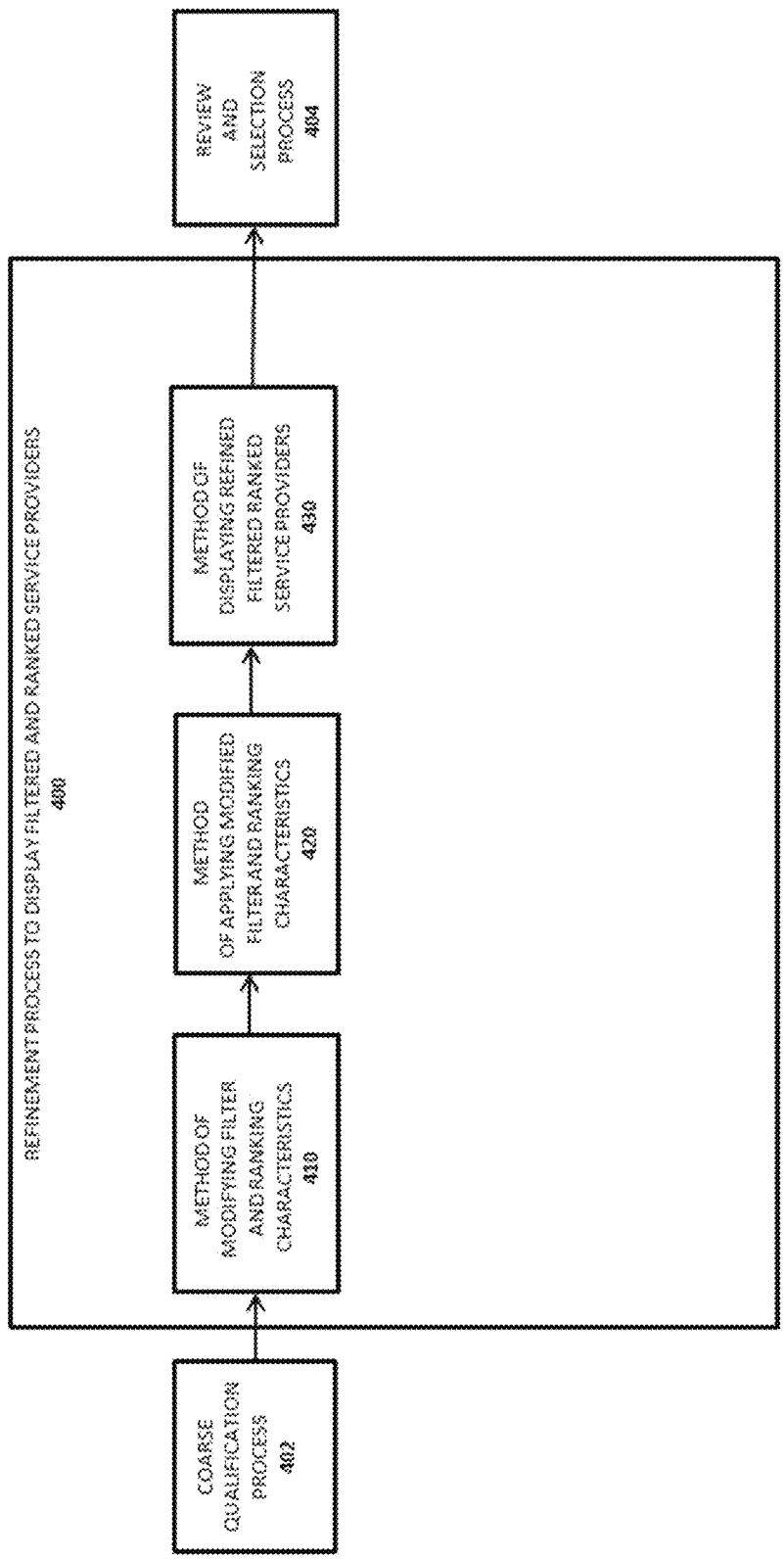
FIG. 4 shows a non-limiting example of a process flow diagram; in this case, a process for refining initial selection of filtered and ranked trusted service providers.

Referring to FIG. 4 (refining initial selection of filtered and ranked service providers), the refinement process to display filtered and ranked service providers 400 refines the initial selection of filtered and ranked caregivers displayed to the customer from the total pool of available service providers made available from the coarse qualification process 402. Refinement process 400 is comprised of method of modifying filter and ranking characteristics 410, method of applying modified filter and ranking characteristics 420, and method of displaying filtered and ranked candidate service providers 430. The output of refinement process to display filtered and ranked service providers 400 is a list of candidate service providers filtered and ranked by customer requirements and displayed N at a time on a computer or mobile device display.

The method of modifying filter and ranking characteristics 410 includes without limitation the ability to change the time and date or specify a range of times and dates, the ability to change the location or region of service, to add to or change the object of the service (persons or property), and to add new or change existing key skills or abilities required by the customer, such as but not limited to second language, specific training or years of experience. Method 410 includes a number of alternatives commonly known to practitioners of the art for text data entry, including text field and selection means and other not described for start date, start time of day, end date and end time of day; and start date, start time of day and duration. Times may be entered in a variety of formats. Locations or regions can be specified with pull-downs, free text, guided text, three-letter airport abbreviations, or other common methods. Languages and other choice-rich areas are best handled with auto-complete text or pull-downs.

The method of applying modified filter and ranking characteristics 420 uses the modified start and end date/time and modified filter characteristics from method 410 to select certain service providers from the set of all known service providers. Primary filter characteristics from method 410 used in method 420 typically include key pass/fail requirements that can be answered with a clear yes or no answer:

Is the client in the service provider's service area?

Does the service provider possess specific required skills, such as the foreign language Spanish?

All service providers that are available at the required date and time and available for the necessary duration, and meeting all of the customer-specified filter characteristics, such as location or language requirements, are known here as candidate service providers. The output of method 420 is a list or set of candidate service providers who meet the practical availability requirement specified by method 410 and fulfill all critical filter characteristics from 410 needed to satisfy fully the practical part of the client's concerns.

The method of displaying filtered and ranked candidate service providers 430 displays N selected candidate service providers from method 420 at a time according to modified ranking characteristics from method 410, where N may be zero or any number of service providers up to a maximum useful simultaneous review count determined by display size and user environment. N may be zero, one, or a larger number up to around a dozen, but N is optimally four to nine service providers viewable at a time. One or more different ranking characteristics from method 410 may applied, where ranking characteristics are used to sort the display of service providers in order of their degree of match against the specified ranking characteristics. If the number of displayable service providers is larger than the number that can be simultaneously viewed, additional service providers after the first viewable set can be viewed by paging through successive pages of viewable service providers using standard paging techniques known in the industry such as page number lists with up and down arrows, lists of all pages by index. The output of method 430 is a display of N service providers, known to be available at date and time specified by method 410, further selected using filter characteristics, such as region and language, specified by method 410, selected using method 420, ranked or sorted by ranking characteristics, such as years of experience, specified by method 410, such that additional qualified candidate service providers can be viewed N at a time until all have been viewed.

Review and Selection Process

Referring to FIG. 5, the review and selection process for trusted service provider 500 takes a set of candidate service providers as input from refinement process 502 who all resolve the practical (scheduling and location) concerns of the customer. Review and selection process for trusted service provider 500 allows the customer to resolve outstanding rational and emotional concerns so as to book an appointment with one of the available qualified candidate service providers. The review and selection process is comprised of a method of selecting one of many displayed service providers 510, method of resolving client emotional concerns for selected service provider 520, method of resolving client rational concerns for selected service provider 530, method of selecting service provider 540, and method of confirming service provider and event 550.

Method of selecting one of many displayed service providers 510 is a method of selecting one of the available and displayed service providers for examination and inspection from refinement process 502. Method 510 may include techniques standard to the industry such as using a mouse, touchscreen or tab key to highlight the selection with, for example, reverse video for text or graphics, border on/off/change color or other visual reminders, followed by a mouse click or keyboard action.

Method of resolving client emotional concerns for selected service provider 520 is a method of resolving the critical client emotional concerns (such as trust) for the selected service provider so as to allow the customer to book an event with the selected service provider. This method of resolving client emotional concerns for the selected service provider, further described in FIG. 6, includes a method of providing service provider live or streaming recorded video composited with other video, still images, or text, with or without audio, to client to resolve client emotional concerns 522 and a method of providing service provider credentials to client to resolve client emotional concerns 524. The book now button 528 is a button on an application or website, or any other user input method that can be performed contemporaneously with or during any other part of method of resolving client emotional concerns for selected service provider 520, that concludes any other part of method 520 already in progress, and follows path select current service provider 552 to immediately start method of confirming service provider and event 550 with the currently selected service provider.

The time to resolve emotional concerns 526 is the sum of the time to perform method 522 and the time for to perform method 524. The time to resolve emotional concerns 526 must be less than the optimal customer review period 560, associated with the time to make a first impression, which in various embodiments, is about 3, 2, or 1 minute or less, or about 60, 50, 40, 30, 20, or 10 seconds or less.

Method of resolving client rational concerns for selected service provider 530 is a method of resolving critical, outstanding and as of yet unresolved client rational concerns (such as additional required skills like second language) for the selected service provider so as to allow the customer to book an event with the selected service provider. If all client rational concerns have been resolved in method of resolving client emotional concerns for selected service provider 520, then this method may be skipped. This method of resolving client rational concerns for the selected service provider, further described in FIG. 7, includes a method of providing service provider live or streaming recorded video composited with other video, still images, or text, with or without audio, to client to resolve client rational concerns. The book now button 536 is a button on an application or website, or any other user input method that can be performed contemporaneously with or during any other part of method of resolving client rational concerns for selected service provider 530, that concludes any other part of method 530 already in progress, and follows path select current service provider 554 to immediately start method of confirming service provider and event 550 with the currently selected service provider. The time to resolve rational concerns 534 is the period of the time to perform method 530. The time to resolve rational concerns 534 must be less than the optimal customer review period 560, associated with the time to make a first impression, which in various embodiments, is about 3, 2, or 1 minute or less, or about 60, 50, 40, 30, 20, or 10 seconds or less.

In method of resolving client rational concerns for selected service provider 530, the resolution of emotional concerns in method 520 and the resolution of rational concerns in method 530 are enhanced when both are resolved near simultaneously or in parallel. The time to resolve emotional concerns 526 plus the time to resolve rational concerns 534 should be less than the optimal customer review period 560, associated with the time to make a first impression, which in various embodiments, is about 3, 2, or 1 minute or less, or about 60, 50, 40, 30, 20, or 10 seconds or less.

The method of selecting service provider 540 is a method of allowing the client to select a course of action during or after performing method 520 for resolving client emotional concerns and during or after method 530 for resolving client emotional concerns. As an example, a sequential flow of activity, such as starting with method 520, which concludes before method 530 starts, which concludes before method 540 starts, is an illustration of a single simple implementation that omits for clarity the execution of method 540 during method 520 or during method 530. The execution of method 540 during method 520 or method 530 would immediately conclude the respective method currently in progress to allow actions in method 540 to be immediately performed. Based upon customer selection, the four allowable courses of action in method 540 are:

1) to continue to method of confirming service provider and event 550 by following path select current candidate service provider 542 to select the current candidate service provider and confirm and complete the booking and contract activity for the planned event;

2) to return to method of selecting one of many displayed service providers 510 by following path review new candidate from existing selection 544 to review another candidate from the existing and current displayed pool of filtered and tanked service providers without changing filtering or ranking characteristics;

3) to return to refinement process 502 by following path change filter and rank characteristics to create new pool of service providers 546 to change filter and ranking characteristics which are applied against the complete set of available caregivers to create a new pool of candidate service providers from which to again review and select in review and selection process for trusted service provider 500; and 4) to cancel the service provider evaluation process by following path cancel 548 to return to the home page of the application or web site.

The method of selecting service provider 540 may use a variety of methods known to practitioners of the art for displaying and selecting one of four alternatives, such as depressing a button on the website or application, selecting a radio button, or other common alternative that indicates an active customer selection. The invention has been reduced to practice with radio buttons for selecting a primary and secondary choice from a field of candidate service providers.

The method of confirming service provider and event 550 confirms practical concerns have been properly resolved with the customer, and confirms the service event by setting a contract in place between the customer and the service provider. Practical concerns subject to verification and agreement between customer and service provider may include, but are not limited to: the service provider name; service location; service date and time of the event; any other customer-identified critical requirements; initial invoice; and deposit. Terms and condition from other contracts and agreements between customer and service provider may be incorporated in the practical concerns by reference. The confirmation of resolution of practical concerns requires presentation of a summary of practical concerns, terms and conditions to the customer using the preferred communications method of the customer, and a positive response by the customer indicating their acceptance of the invoice as a contract with terms of services and payment. Various methods of recording customer acceptance may be employed, including but not limited to a button press on an application or website with password authentication, audio recording with explicit customer permission, or other methods agreed to by both customer and client in advance in writing.

Method of Displaying Service Providers to Resolve Emotional Concerns

Figure 6:
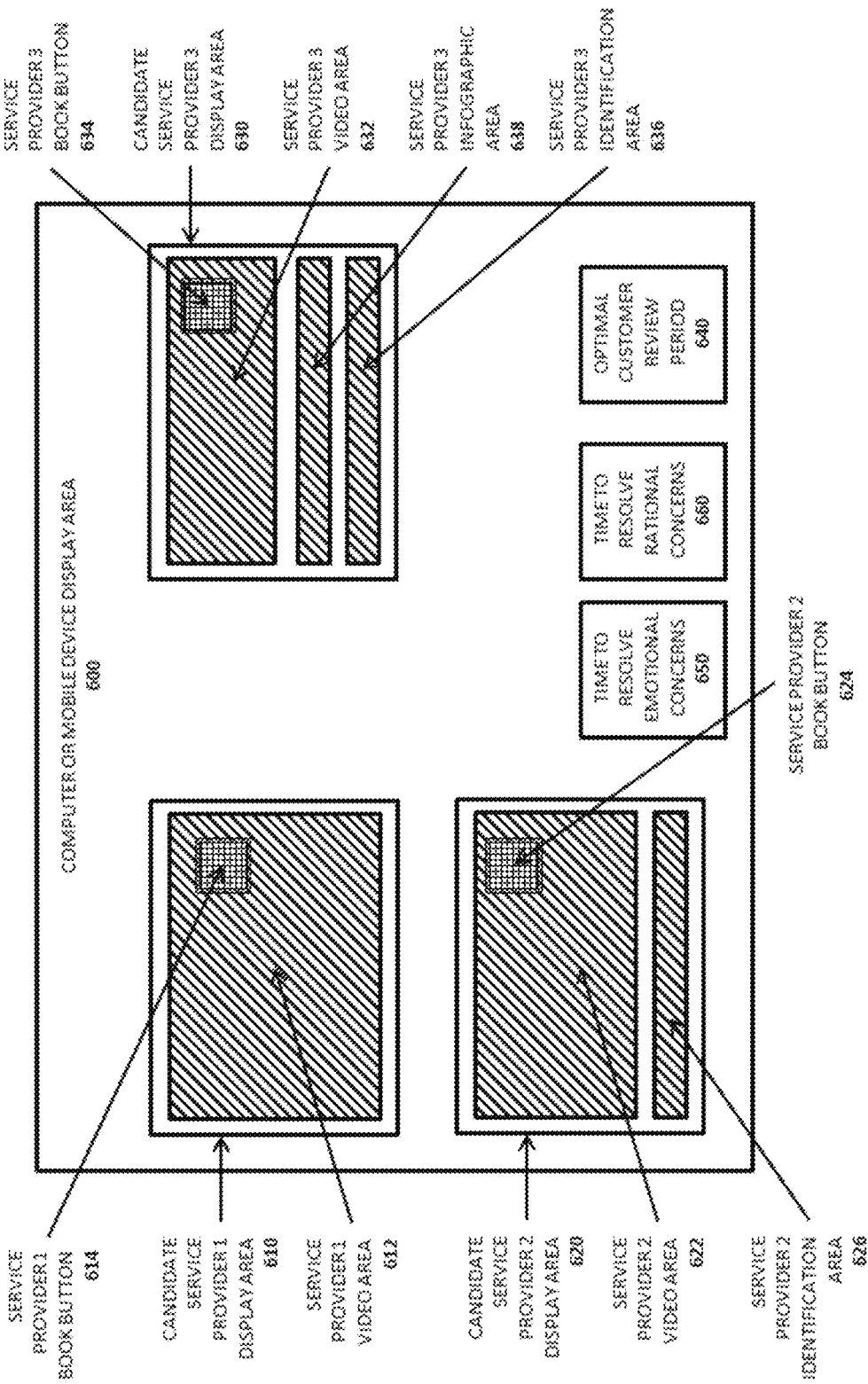
FIG. 6 shows a non-limiting example of a process flow diagram; in this case, a process for displaying service providers to resolve emotional concerns.

Referring to FIG. 6 (Method Of Displaying Service Providers To Resolve Emotional Concerns), the three different depictions of service providers provide preferred ways to display a service provider to a customer that enhances the customer's ability to resolve quickly his or her critical emotional concerns, about for example but not limited to safety and trust.

On a computer or mobile display device 600, service provider 1 display area 610 contains all of the information provided to the customer about the selected service provider, and is comprised of: 1) a service provider video area 612; and 2) a service provider book button 614, which is in service provider 1 display area 610 but may or may not be on top of service provider video area 612. The service provider video area 612 presents a recorded video stream of the service provider with the cut of the video stream focused on the upper body and torso of the service provider so as to include the head, shoulders, arms and hands. If the service provider book button 614 is located within the service provider video area 612, it should be placed at the upper left or upper right of service provider video area 612 so as to not occlude the centrally located face of the service provider in the recorded video playing in service provider video area 612. The service provider video area 612 presents a short recorded video of the service provider conveying the service provider's name, offering and qualifications, with the aim of using eye contact and non-verbal communications and gestures to establish an initial bond of trust between the customer and service provider to resolve emotional concerns, and the aim of using the verbally communicated qualifications to resolve rational concerns. The customer pressing of the service provider book button 614, operable before, contemporaneously or after the viewing of a live or recorded video stream in Service provider video area 612, indicates that outstanding emotional and rational concerns about booking a service event with the currently selected service provider have been resolved, concludes any viewing of any live or recorded video stream in progress, and proceeds directly to confirm the practical concerns of booking the event culminating in the approval of a service contract between the customer and service provider. The duration of the video clip playing in service provider video area 612 which comprises the time to resolve emotional concerns 650 must be less than optimal customer review period 640, which is the time it takes to make a first impression, usually about 1-3 minutes or less or about 10-60 seconds or less.

On a computer or mobile display device 600, service provider 2 display area 620 contains all of the information provided to the customer about the selected service provider, and is comprised of: 1) a service provider video area 622; 2) a service provider book button 624, which is in service provider 2 display area 620 but may or may not be on top of service provider video area 622; and 3) a service provider identification area 626. The service provider video area 622 presents a recorded video stream of the service provider with the cut of the video stream focused on the upper body and torso of the service provider so as to include the head, shoulders, arms and hands. If the service provider book button 624 is located within the service provider video area 622, it should be placed at the upper left or upper right of service provider video area 622 so as to not occlude the centrally located face of the service provider in the recorded video playing in service provider video area 622. The service provider video area 622 presents a short recorded video of the service provider conveying the service provider's offering and qualifications, with the aim of using eye contact and non-verbal communications and gestures to establish an initial bond of trust between the customer and service provider to resolve emotional concerns, and the aim of using the verbally communicated qualifications to resolve rational concerns. The customer pressing of the service provider book button 624, operable before, contemporaneously or after the viewing of a live or recorded video stream in service provider video area 622, indicates that outstanding emotional and rational concerns about booking a service event with the currently selected service provider have been resolved, concludes any viewing of any live or recorded video stream in progress, and proceeds directly to confirm the practical concerns of booking the event culminating in the approval of a service contract between the customer and service provider. The service provider identification area 626 contains the simplest information that allows the customer to unambiguously refer to a specific service provider viewing one or more service providers on computer or mobile display device 600—it is hard to establish trust someone without a name, and a name introduction is generally the first step in a job interview. The information in service provider identification area 626 is most often a name with or without abbreviations and with or without titles and suffixes, but may include other means of identification such as, but not limited to locations, such as a specific service bay in a car dealership or a specific room in a massage studio, and times, such as the 12:30 pm train. The duration of the video clip playing in service provider video area 622 which comprises the time to resolve emotional concerns 650 must be less than optimal customer review period 640, which is the time it takes to make a first impression, usually about 1-3 minutes or less or about 10-60 seconds or less.

On a computer or mobile display device 600, service provider 3 display area 630 contains all of the information provided to the customer about the selected service provider, and is comprised of: 1) a service provider video area 632; 2) a service provider book button 634, which is in service provider 3 display area 630 but may or may not be on top of service provider video area 632; 3) a service provider identification area 636; and 4) a service provider infographic area 638. The service provider video area 632 presents a recorded video stream of the service provider with the cut of the video stream focused on the upper body and torso of the service provider so as to include the head, shoulders, arms and hands. If the service provider book button 634 is located within the service provider video area 632, it should be placed at the upper left or upper right of service provider video area 632 so as to not occlude the centrally located face of the service provider in the recorded video playing in service provider video area 632. The service provider video area 632 presents a short recorded video of the service provider conveying the service provider's offering and qualifications, with the aim of using eye contact and non-verbal communications and gestures to establish an initial bond of trust between the customer and service provider to resolve emotional concerns, and the aim of using the verbally communicated qualifications to resolve rational concerns. The customer pressing of the service provider book button 634, operable before, contemporaneously or after the viewing of a live or recorded video stream in service provider video area 632, indicates that outstanding emotional and rational concerns about booking a service event with the currently selected service provider have been resolved, concludes any viewing of any live or recorded video stream in area 632 or infographic in area 638 in progress, and proceeds directly to confirm the practical concerns of booking the event culminating in the approval of a service contract between the customer and service provider. The service provider identification area 636 contains the simplest information that allows the customer to unambiguously refer to a specific service provider viewing one or more service providers on computer or mobile display device 600—it is hard to establish trust someone without a name, and a name introduction is generally the first step in a job interview. The information in service provider identification area 636 is most often a name with or without abbreviations and with or without titles and suffixes, but may include other means of identification such as, but not limited to locations, such as a specific service bay in a car dealership or a specific room in a massage studio, and times, such as the 12:30 pm train. The service provider infographic area 638 contains the simple graphics that show the service providers qualifications using one or more or the customer-specified filter or ranking characteristics specified by the customer to display service providers of interest. The simple graphics may be horizontal bar graphs with a title consisting of one or two words or an icon or logo of a familiar organization and a horizontal bar showing degree or amount or level associated with that title; a collection of one or more graphics, logos or icons showing certifications and meaningful affiliations including but not limited to past employers; or one or more still images or photographs or artistic renditions. The content of the service provider infographic area 638 specifically does not contain detailed text that draws significant focus and attention away from the recorded or live video stream presented in service provider video area 632. The duration of the video clip playing in service provider video area 632 which comprises the time to resolve emotional concerns 650 must be less than optimal customer review period 640, which is the time it takes to make a first impression, usually about 1-3 minutes or less or about 10-60 seconds or less.

Method of Displaying Service Providers to Resolve Rational Concerns

Figure 7:
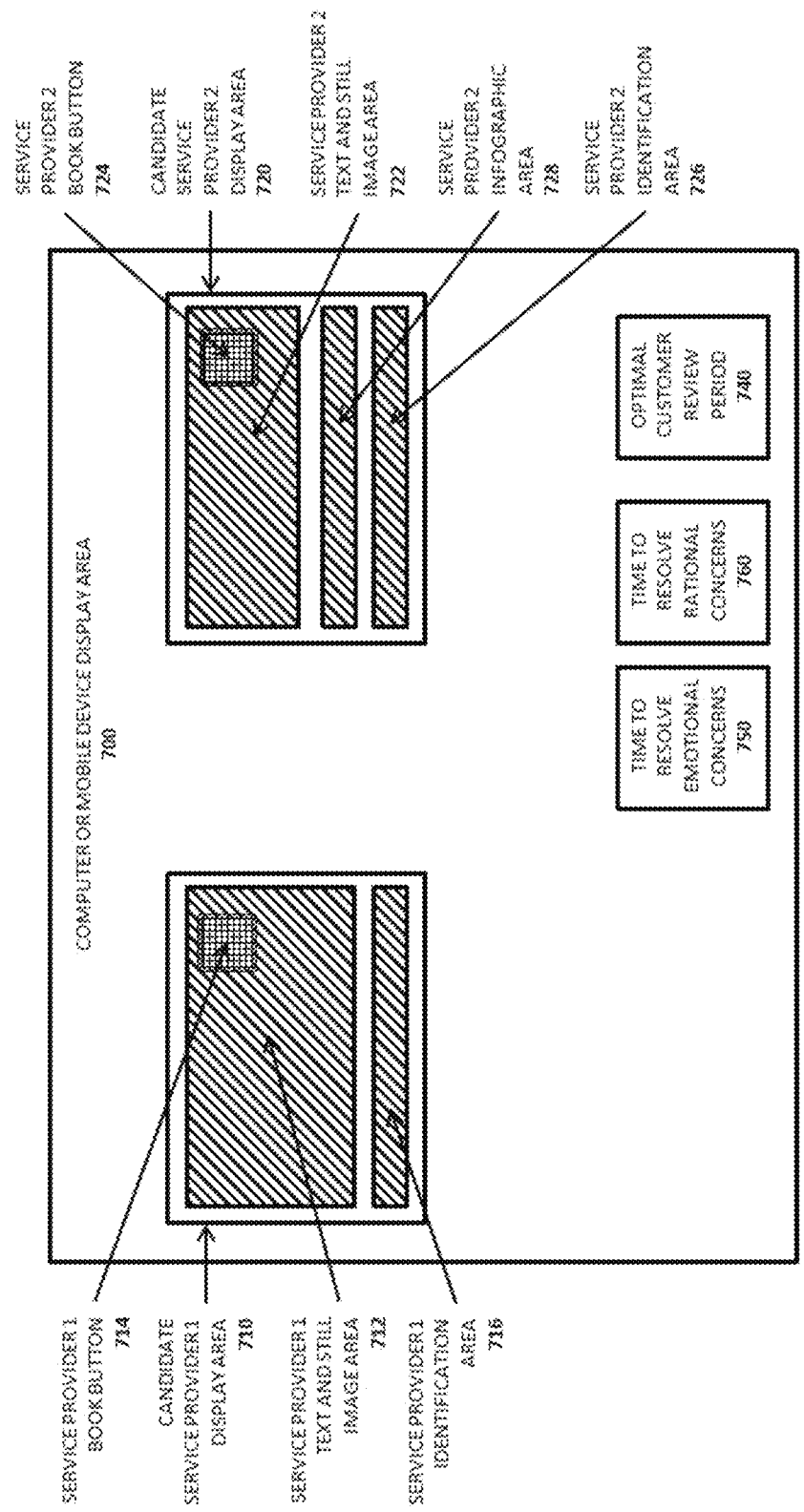
FIG. 7 shows a non-limiting example of a process flow diagram; in this case, a process for displaying service providers to resolve rational concerns.

Referring to FIG. 7 (Method Of Displaying Service Providers To Resolve Rational Concerns), the two different depictions of service providers provide preferred ways to display a service provider to a customer that enhances the customer's ability to resolve quickly his or her critical rational concerns, about for example but not limited to specific requirements for language such as Spanish or special care needs such as autism.

On a computer or mobile display device 700, service provider 1 display area 710 contains all of the information provided to the customer about the selected service provider, and is comprised of: 1) a service provider text and still image area 712; 2) a service provider book button 714, which is in service provider 1 display area 710 but may or may not be on top of service provider text and still image area 712; and 3) a service provider identification area 716. The service provider text and still area 712 presents text and still images that resolve outstanding rational concerns about qualifications indicated by the customer selection of filtering and ranking characteristics, and often include but are not limited to location, experience, applicable certifications and licenses, and references. If the service provider book button 714 is located within the service provider text and still image area 712, it should be placed at the upper right of service provider text and still image area 712 so as to not occlude the text and still images which are frequently left justified in service provider text and still image area 712. The customer pressing of the service provider book button 714, operable before, contemporaneously or after the viewing of a text or images in service provider text and still image area 712, indicates that any outstanding rational concerns about booking a service event with the currently selected service provider have been resolved, concludes any viewing of any text or images in progress, and proceeds directly to confirm the practical concerns of booking the event culminating in the approval of a service contract between the customer and service provider. The service provider identification area 636 contains the simplest information that allows the customer to unambiguously refer to a specific service provider viewing one or more service providers on computer or mobile display device 600. The information in service provider identification area 626 is most often a name with or without abbreviations and with or without titles and suffixes, but may include other means of identification such as, but not limited to locations, such as a specific service bay in a car dealership or a specific room in a massage studio, and times, such as the 12:30 pm train. The information presented to the customer in service provider 1 display area 710 which comprises the time to resolve rational concerns 760 must be visible for less than optimal customer review period 640, which is the time it takes to make a first impression, usually a minute or less. For optimal resolution of rational and emotional concerns, the information presented to the customer in service provider 1 display area 710 which comprises the time to resolve rational concerns 760 plus any previous time to resolve emotional concerns 750 should be for less than optimal customer review period 640, which is the time it takes to make a first impression, usually a minute or less.

On a computer or mobile display device 700, service provider 2 display area 720 contains all of the information provided to the customer about the selected service provider, and is comprised of: 1) a service provider text and still image area 722; 2) a service provider book button 724, which is in service provider 1 display area 720 but may or may not be on top of service provider text and still image area 722; 3) a service provider identification area 726; and 4) a service provider infographic area 728. The service provider text and still area 722 presents text and still images that resolve outstanding rational concerns about qualifications indicated by the customer selection of filtering and ranking characteristics, and often include but are not limited to location, experience, applicable certifications and licenses, and references. If the service provider book button 724 is located within the service provider text and still image area 722, it should be placed at the upper right of service provider text and still image area 722 so as to not occlude the text and still images which are frequently left justified in service provider text and still image area 722. The customer pressing of the service provider book button 724, operable before, contemporaneously or after the viewing of a text or images in service provider text and still image area 722, indicates that any outstanding rational concerns about booking a service event with the currently selected service provider have been resolved, concludes any viewing of any text or images in progress, and proceeds directly to confirm the practical concerns of booking the event culminating in the approval of a service contract between the customer and service provider. The service provider identification area 636 contains the simplest information that allows the customer to unambiguously refer to a specific service provider viewing one or more service providers on computer or mobile display device 600. The information in service provider identification area 726 is most often a name with or without abbreviations and with or without titles and suffixes, but may include other means of identification such as, but not limited to locations, such as a specific service bay in a car dealership or a specific room in a massage studio, and times, such as the 12:30 pm train. The service provider infographic area 728 contains simple graphics that show the service providers qualifications using one or more or the customer-specified filter or ranking characteristics specified by the customer to display service providers of interest. The simple graphics may be horizontal bar graphs with a title consisting of one or two words or an icon or logo of a familiar organization and a horizontal bar showing degree or amount or level associated with that title; a collection of one or more graphics, logos or icons showing certifications and meaningful affiliations including but not limited to past employers; or one or more still images or photographs or artistic renditions. The content of the service provider infographic area 728 specifically does not contain detailed text that draws significant focus and attention away from the recorded or live video stream presented in service provider video area 722. The information presented to the customer in service provider 2 display area 720 which comprises the time to resolve rational concerns 760 must be visible for less than optimal customer review period 640, which is the time it takes to make a first impression, usually a minute or less. For optimal resolution of rational and emotional concerns, the information presented to the customer in service provider 2 display area which comprises the time to resolve rational concerns 760 plus any previous time to resolve emotional concerns 750 should be less than optimal customer review period 640, which is the time it takes to make a first impression, usually a minute or less.

Mobile User Interface

In some embodiments, the systems, media, and methods described herein include a mobile user interface, or use of the same. For example, in some embodiments, an application for selecting and engaging a new in-home care service provider presents an interactive mobile user interface. In further embodiments, the mobile user interface provides user's access to a coarse qualification process, a qualification refinement process, and a service provider booking process.

Figure 8:
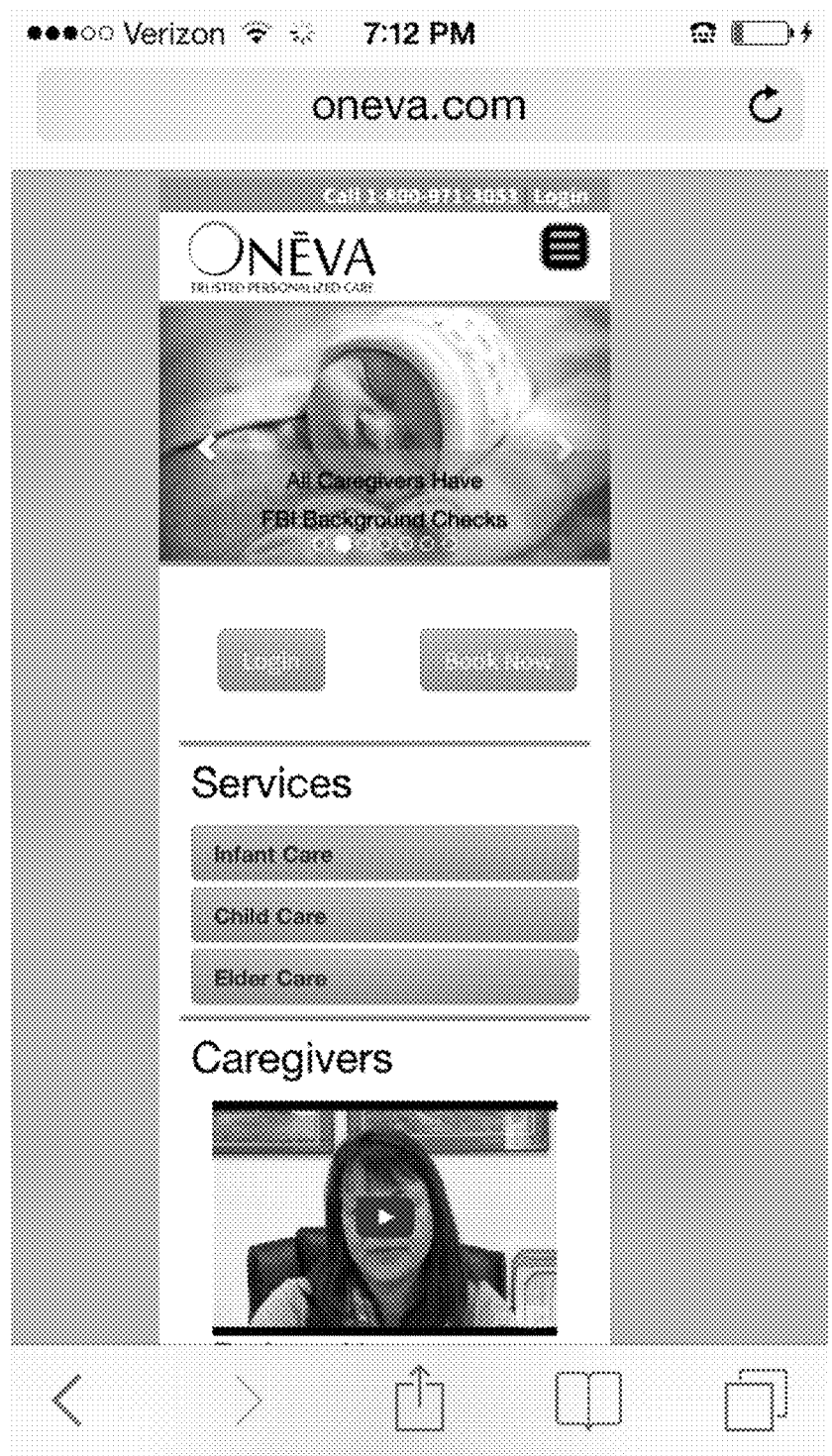
FIG. 8 shows a non-limiting example of an interface for a platform for providing occasional in-home care; in this case, a mobile interface demonstrating a landing screen.

Referring to FIG. 8, in a particular embodiment, an application for selecting and engaging a new in-home care service provider presents an interactive mobile user interface including a landing screen. In this embodiment, the landing screen includes user interface elements to access infant care services, child care services, and elder care services. Further, in this embodiment, the landing screen includes caregiver videos.

Figure 9:
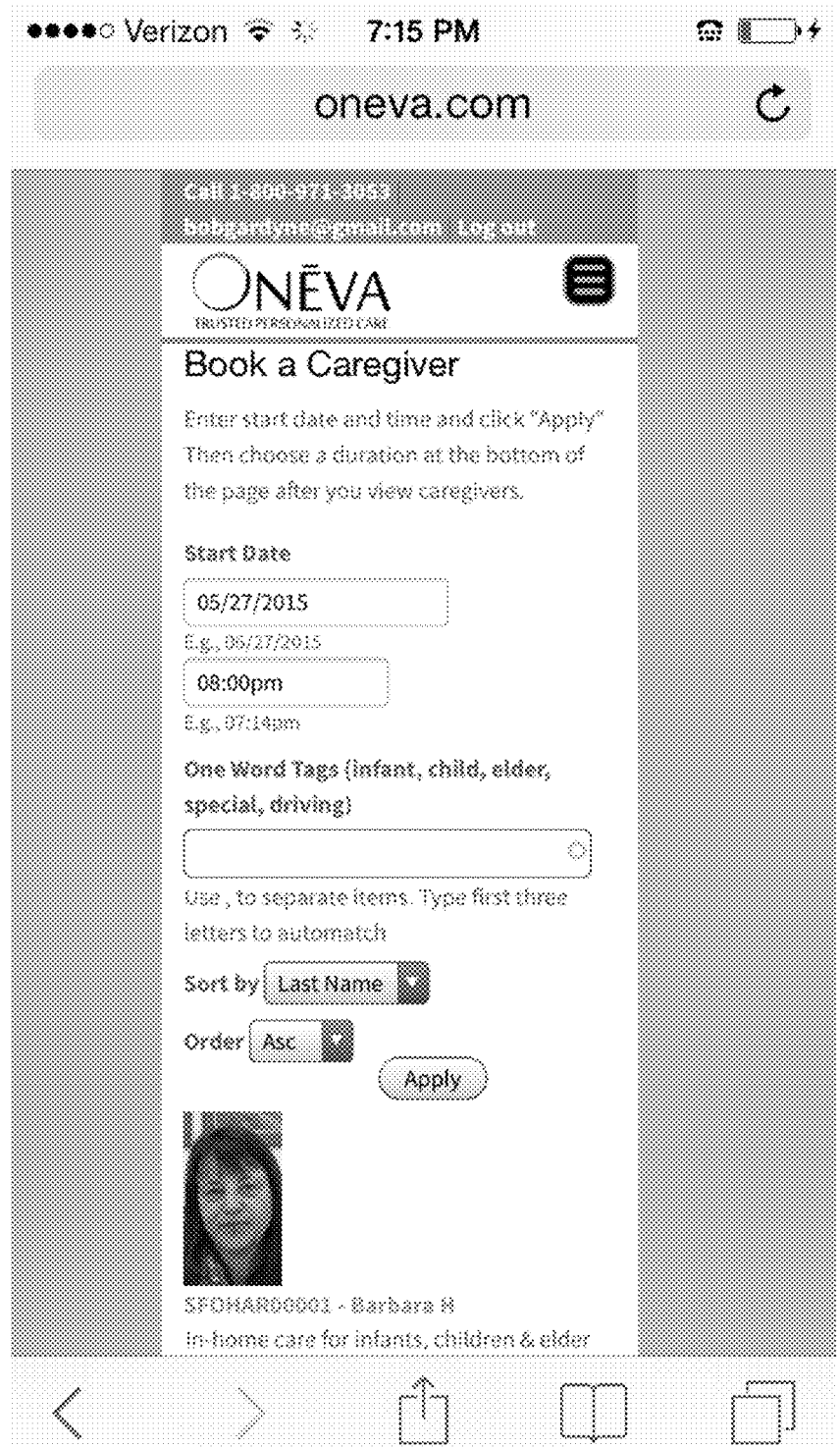
FIG. 9 shows a non-limiting example of an interface for a platform for providing occasional in-home care; in this case, a mobile interface demonstrating a caregiver identification and selection screen.

Referring to FIG. 9, in a particular embodiment, an application for selecting and engaging a new in-home care service provider presents an interactive mobile user interface including a caregiver identification and selection screen. In this embodiment, the caregiver identification and selection screen includes user interface elements to input a start date and time and keyword search tags. Further, in this embodiment, the caregiver identification and selection screen includes user interface elements to configure parameters for display of results such as "sort by" and "sort order" parameters.

Figure 10:
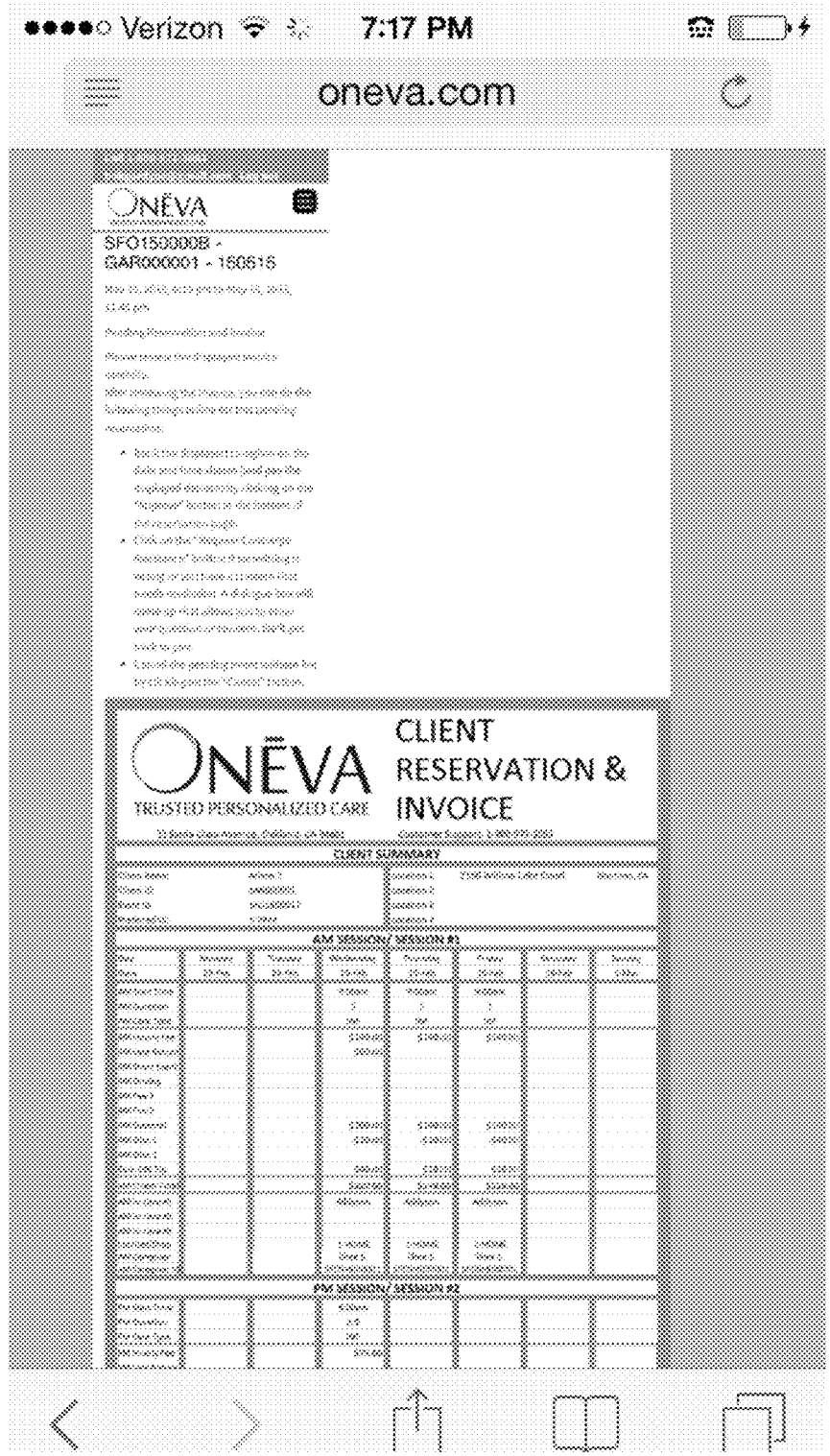
FIG. 10 shows a non-limiting example of an interface for a platform for providing occasional in-home care; in this case, a mobile interface demonstrating a client invoice for occasional in-home care services.

Referring to FIG. 10, in a particular embodiment, an application for selecting and engaging a new in-home care service provider presents an interactive mobile user interface including tools for accessing client invoices for occasional in-home care services. In this embodiment, an exemplary invoice includes a client summary and a breakdown of care provided and the cost thereof per caregiving session.

Digital Processing Device

In some embodiments, the systems, media, and methods described herein include a digital processing device, or use of the same. In further embodiments, the digital processing device includes one or more hardware central processing units (CPU) that carry out the device's functions. In still further embodiments, the digital processing device further comprises an operating system configured to perform executable instructions. In some embodiments, the digital processing device is optionally connected a computer network. In further embodiments, the digital processing device is optionally connected to the Internet such that it accesses the World Wide Web. In still further embodiments, the digital processing device is optionally connected to a cloud computing infrastructure. In other embodiments, the digital processing device is optionally connected to an intranet. In other embodiments, the digital processing device is optionally connected to a data storage device.

In accordance with the description herein, suitable digital processing devices include, by way of non-limiting examples, server computers, desktop computers, laptop computers, notebook computers, sub-notebook computers, netbook computers, netpad computers, set-top computers, media streaming devices, handheld computers, Internet appliances, mobile smartphones, tablet computers, personal digital assistants, video game consoles, and vehicles. Those of skill in the art will recognize that many smartphones are suitable for use in the system described herein. Those of skill in the art will also recognize that select televisions, video players, and digital music players with optional computer network connectivity are suitable for use in the system described herein. Suitable tablet computers include those with booklet, slate, and convertible configurations, known to those of skill in the art.

In some embodiments, the digital processing device includes an operating system configured to perform executable instructions. The operating system is, for example, software, including programs and data, which manages the device's hardware and provides services for execution of applications. Those of skill in the art will recognize that suitable server operating systems include, by way of non-limiting examples, FreeBSD, OpenBSD, NetBSD®, Linux, Apple® Mac OS X Server®, Oracle® Solaris®, Windows Server®, and Novell® NetWare®. Those of skill in the art will recognize that suitable personal computer operating systems include, by way of non-limiting examples, Microsoft® Windows®, Apple® Mac OS X®, UNIX®, and UNIX-like operating systems such as GNU/Linux®. In some embodiments, the operating system is provided by cloud computing. Those of skill in the art will also recognize that suitable mobile smart phone operating systems include, by way of non-limiting examples, Nokia® Symbian® OS, Apple® iOS®, Research In Motion® BlackBerry OS®, Google® Android®, Microsoft® Windows Phone® OS, Microsoft® Windows Mobile® OS, Linux®, and Palm® WebOS®. Those of skill in the art will also recognize that suitable media streaming device operating systems include, by way of non-limiting examples, Apple TV®, Roku®, Boxee®, Google TV®, Google Chromecast®, Amazon Fire®, and Samsung® HomeSync®. Those of skill in the art will also recognize that suitable video game console operating systems include, by way of non-limiting examples, Sony® PS3®, Sony® PS4®, Microsoft® Xbox 360®, Microsoft Xbox One, Nintendo® Wii®, Nintendo® Wii U®, and Ouya®.

In some embodiments, the device includes a storage and/or memory device. The storage and/or memory device is one or more physical apparatuses used to store data or programs on a temporary or permanent basis. In some embodiments, the device is volatile memory and requires power to maintain stored information. In some embodiments, the device is non-volatile memory and retains stored information when the digital processing device is not powered. In further embodiments, the non-volatile memory comprises flash memory. In some embodiments, the non-volatile memory comprises dynamic random-access memory (DRAM). In some embodiments, the non-volatile memory comprises ferroelectric random access memory (FRAM). In some embodiments, the non-volatile memory comprises phase-change random access memory (PRAM). In other embodiments, the device is a storage device including, by way of non-limiting examples, CD-ROMs, DVDs, flash memory devices, magnetic disk drives, magnetic tapes drives, optical disk drives, and cloud computing based storage. In further embodiments, the storage and/or memory device is a combination of devices such as those disclosed herein.

In some embodiments, the digital processing device includes a display to send visual information to a user. In some embodiments, the display is a cathode ray tube (CRT). In some embodiments, the display is a liquid crystal display (LCD). In further embodiments, the display is a thin film transistor liquid crystal display (TFT-LCD). In some embodiments, the display is an organic light emitting diode (OLED) display. In various further embodiments, on OLED display is a passive-matrix OLED (PMOLED) or active-matrix OLED (AMOLED) display. In some embodiments, the display is a plasma display. In other embodiments, the display is a video projector. In still further embodiments, the display is a combination of devices such as those disclosed herein.

In some embodiments, the digital processing device includes an input device to receive information from a user. In some embodiments, the input device is a keyboard. In some embodiments, the input device is a pointing device including, by way of non-limiting examples, a mouse, trackball, track pad, joystick, game controller, or stylus. In some embodiments, the input device is a touch screen or a multi-touch screen. In other embodiments, the input device is a microphone to capture voice or other sound input. In other embodiments, the input device is a video camera or other sensor to capture motion or visual input. In further embodiments, the input device is a Kinect, Leap Motion, or the like. In still further embodiments, the input device is a combination of devices such as those disclosed herein.

Non-Transitory Computer Readable Storage Medium

In some embodiments, the systems, media, and methods disclosed herein include one or more non-transitory computer readable storage media encoded with a program including instructions executable by the operating system of an optionally networked digital processing device. In further embodiments, a computer readable storage medium is a tangible component of a digital processing device. In still further embodiments, a computer readable storage medium is optionally removable from a digital processing device. In some embodiments, a computer readable storage medium includes, by way of non-limiting examples, CD-ROMs, DVDs, flash memory devices, solid state memory, magnetic disk drives, magnetic tape drives, optical disk drives, cloud computing systems and services, and the like. In some cases, the program and instructions are permanently, substantially permanently, semi-permanently, or non-transitorily encoded on the media.

Computer Program

In some embodiments, the systems, media, and methods disclosed herein include at least one computer program, or use of the same. A computer program includes a sequence of instructions, executable in the digital processing device's CPU, written to perform a specified task. Computer readable instructions may be implemented as program modules, such as functions, objects, Application Programming Interfaces (APIs), data structures, and the like, that perform particular tasks or implement particular abstract data types. In light of the disclosure provided herein, those of skill in the art will recognize that a computer program may be written in various versions of various languages.

The functionality of the computer readable instructions may be combined or distributed as desired in various environments. In some embodiments, a computer program comprises one sequence of instructions. In some embodiments, a computer program comprises a plurality of sequences of instructions. In some embodiments, a computer program is provided from one location. In other embodiments, a computer program is provided from a plurality of locations. In various embodiments, a computer program includes one or more software modules. In various embodiments, a computer program includes, in part or in whole, one or more web applications, one or more mobile applications, one or more standalone applications, one or more web browser plug-ins, extensions, add-ins, or add-ons, or combinations thereof.

Web Application

In some embodiments, a computer program includes a web application. In light of the disclosure provided herein, those of skill in the art will recognize that a web application, in various embodiments, utilizes one or more software frameworks and one or more database systems. In some embodiments, a web application is created upon a software framework such as Microsoft® .NET or Ruby on Rails (RoR). In some embodiments, a web application utilizes one or more database systems including, by way of non-limiting examples, relational, non-relational, object oriented, associative, and XML database systems. In further embodiments, suitable relational database systems include, by way of non-limiting examples, Microsoft® SQL Server, mySQL™, and Oracle®. Those of skill in the art will also recognize that a web application, in various embodiments, is written in one or more versions of one or more languages. A web application may be written in one or more markup languages, presentation definition languages, client-side scripting languages, server-side coding languages, database query languages, or combinations thereof. In some embodiments, a web application is written to some extent in a markup language such as Hypertext Markup Language (HTML), Extensible Hypertext Markup Language (XHTML), or eXtensible Markup Language (XML). In some embodiments, a web application is written to some extent in a presentation definition language such as Cascading Style Sheets (CSS). In some embodiments, a web application is written to some extent in a client-side scripting language such as Asynchronous Javascript and XML (AJAX), Flash® Actionscript, Javascript, or Silverlight®. In some embodiments, a web application is written to some extent in a server-side coding language such as Active Server Pages (ASP), ColdFusion®, Perl, Java™, JavaServer Pages (JSP), Hypertext Preprocessor (PHP), Python™, Ruby, Tcl, Smalltalk, WebDNA®, or Groovy. In some embodiments, a web application is written to some extent in a database query language such as Structured Query Language (SQL). In some embodiments, a web application integrates enterprise server products such as IBM® Lotus Domino®. In some embodiments, a web application includes a media player element. In various further embodiments, a media player element utilizes one or more of many suitable multimedia technologies including, by way of non-limiting examples, Adobe® Flash®, HTML 5, Apple® QuickTime®, Microsoft® Silverlight®, Java™, and Unity®.

Mobile Application

In some embodiments, a computer program includes a mobile application provided to a mobile digital processing device. In some embodiments, the mobile application is provided to a mobile digital processing device at the time it is manufactured. In other embodiments, the mobile application is provided to a mobile digital processing device via the computer network described herein.

In view of the disclosure provided herein, a mobile application is created by techniques known to those of skill in the art using hardware, languages, and development environments known to the art. Those of skill in the art will recognize that mobile applications are written in several languages. Suitable programming languages include, by way of non-limiting examples, C, C++, C#, Objective-C, Java™, Javascript, Pascal, Object Pascal, Python™, Ruby, VB.NET, WML, and XHTML/HTML with or without CSS, or combinations thereof.

Suitable mobile application development environments are available from several sources. Commercially available development environments include, by way of non-limiting examples, AirplaySDK, alcheMo, Appcelerator®, Celsius, Bedrock, Flash Lite, .NET Compact Framework, Rhomobile, and WorkLight Mobile Platform. Other development environments are available without cost including, by way of non-limiting examples, Lazarus, MobiFlex, MoSync, and Phonegap. Also, mobile device manufacturers distribute software developer kits including, by way of non-limiting examples, iPhone and iPad (iOS) SDK, Android™ SDK, BlackBerry® SDK, BREW SDK, Palm® OS SDK, Symbian SDK, webOS SDK, and Windows® Mobile SDK.

Those of skill in the art will recognize that several commercial forums are available for distribution of mobile applications including, by way of non-limiting examples, Apple® App Store, Android™ Market, BlackBerry® App World, App Store for Palm devices, App Catalog for webOS, Windows® Marketplace for Mobile, Ovi Store for Nokia® devices, Samsung® Apps, and Nintendo® DSi Shop.

Standalone Application

In some embodiments, a computer program includes a standalone application, which is a program that is run as an independent computer process, not an add-on to an existing process, e.g., not a plug-in. Those of skill in the art will recognize that standalone applications are often compiled. A compiler is a computer program(s) that transforms source code written in a programming language into binary object code such as assembly language or machine code. Suitable compiled programming languages include, by way of non-limiting examples, C, C++, Objective-C, COBOL, Delphi, Eiffel, Java™, Lisp, Python™, Visual Basic, and VB.NET, or combinations thereof. Compilation is often performed, at least in part, to create an executable program. In some embodiments, a computer program includes one or more executable complied applications.

Web Browser Plug-in

In some embodiments, the computer program includes a web browser plug-in. In computing, a plug-in is one or more software components that add specific functionality to a larger software application. Makers of software applications support plug-ins to enable third-party developers to create abilities which extend an application, to support easily adding new features, and to reduce the size of an application. When supported, plug-ins enable customizing the functionality of a software application. For example, plug-ins are commonly used in web browsers to play video, generate interactivity, scan for viruses, and display particular file types. Those of skill in the art will be familiar with several web browser plug-ins including, Adobe® Flash® Player, Microsoft® Silverlight®, and Apple® QuickTime®. In some embodiments, the toolbar comprises one or more web browser extensions, add-ins, or add-ons. In some embodiments, the toolbar comprises one or more explorer bars, tool bands, or desk bands.

In view of the disclosure provided herein, those of skill in the art will recognize that several plug-in frameworks are available that enable development of plug-ins in various programming languages, including, by way of non-limiting examples, C++, Delphi, Java™, PHP, Python™, and VB.NET, or combinations thereof.

Web browsers (also called Internet browsers) are software applications, designed for use with network-connected digital processing devices, for retrieving, presenting, and traversing information resources on the World Wide Web. Suitable web browsers include, by way of non-limiting examples, Microsoft® Internet Explorer®, Mozilla® Firefox®, Google® Chrome, Apple® Safari®, Opera Software® Opera®, and KDE Konqueror. In some embodiments, the web browser is a mobile web browser. Mobile web browsers (also called mircrobrowsers, mini-browsers, and wireless browsers) are designed for use on mobile digital processing devices including, by way of non-limiting examples, handheld computers, tablet computers, netbook computers, subnotebook computers, smartphones, music players, personal digital assistants (PDAs), and handheld video game systems. Suitable mobile web browsers include, by way of non-limiting examples, Google® Android® browser, RIM BlackBerry® Browser, Apple® Safari®, Palm® Blazer, Palm® WebOS® Browser, Mozilla® Firefox® for mobile, Microsoft® Internet Explorer® Mobile, Amazon® Kindle® Basic Web, Nokia® Browser, Opera Software® Opera® Mobile, and Sony® PSP™ browser.

Software Modules

In some embodiments, the systems, media, and methods disclosed herein include software, server, and/or database modules, or use of the same. In view of the disclosure provided herein, software modules are created by techniques known to those of skill in the art using machines, software, and languages known to the art. The software modules disclosed herein are implemented in a multitude of ways. In various embodiments, a software module comprises a file, a section of code, a programming object, a programming structure, or combinations thereof. In further various embodiments, a software module comprises a plurality of files, a plurality of sections of code, a plurality of programming objects, a plurality of programming structures, or combinations thereof. In various embodiments, the one or more software modules comprise, by way of non-limiting examples, a web application, a mobile application, and a standalone application. In some embodiments, software modules are in one computer program or application. In other embodiments, software modules are in more than one computer program or application. In some embodiments, software modules are hosted on one machine. In other embodiments, software modules are hosted on more than one machine. In further embodiments, software modules are hosted on cloud computing platforms. In some embodiments, software modules are hosted on one or more machines in one location. In other embodiments, software modules are hosted on one or more machines in more than one location.

Databases

In some embodiments, the systems, media, and methods disclosed herein include one or more databases, or use of the same. In view of the disclosure provided herein, those of skill in the art will recognize that many databases are suitable for storage and retrieval of child and caregiver information. In various embodiments, suitable databases include, by way of non-limiting examples, relational databases, non-relational databases, object oriented databases, object databases, entity-relationship model databases, associative databases, and XML databases. In some embodiments, a database is Internet-based. In further embodiments, a database is web-based. In still further embodiments, a database is cloud computing-based. In other embodiments, a database is based on one or more local computer storage devices.

While preferred embodiments of the present invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the invention.

What is claimed is:

1. A computer-implemented method for selecting and arranging new in-home care service provider icons and video clips on a graphical user interface (GUI) within a predetermined period of time, the method comprising:
   a) providing, by a computer, a coarse qualification process, the coarse qualification process comprising:
      i. providing, by the computer, a plurality of primary filters and primary ranking characteristics for service providers, the primary filters comprising at least location, availability, and skills;
      ii. receiving, by the computer, a user selection of the primary filters and the primary ranking characteristics;
      iii. determining, by the computer, one or more candidate service providers based on the user selected primary filters and the primary ranking characteristics; and
      iv. automatically displaying, by the computer, up to four candidate service provider icons simultaneously viewable in one set at one time on the GUI, wherein each candidate service provider icon displays a candidate service provider's head, shoulders, and eye contact;
   b) providing, by the computer, a qualification refinement process, the qualification refinement process comprising:
      i. providing, by the computer, an option to modify the primary filters and primary ranking characteristics:
      ii. receiving, by the computer, a user selection to modify the primary filters and primary ranking characteristics;
      iii. determining, by the computer, one or more refined candidate service providers based on the user selected modified filters and modified ranking characteristics; and
      iv. automatically displaying, by the computer, up to four refined candidate service provider icons simultaneously viewable in one set at one time on the GUI, wherein each refined candidate service provider icon displays a refined candidate service provider's head, shoulders, and eye contact; and
   c) providing, by the computer, a service provider booking process, the service provider booking process comprising:
      i. receiving, by the computer, a user selection of refined candidate service provider icons;
      ii. generating, by the computer, one or more service provider candidate boxes based on the user selected refined candidate service provider icons; and
      iii. automatically displaying, by the computer, up to four service provider candidate boxes simultaneously viewable in one set at one time on the GUI characterized by at least one of: (A) a first service provider candidate box disposed on a top left area of the GUI; (B) a second service provider candidate box disposed on the bottom left area of the GUI; (C) a third service provider candidate box disposed on the top right area of the GUI; and (D) a fourth service provider candidate box disposed on the bottom right area of the GUI;

wherein each service provider candidate box comprises a service provider video clip and a service provider qualification section;

wherein each service provider video clip is configured to present a recorded video stream of the service provider, wherein each video stream of the service provider conveys the service provider's name, offering, and qualification, wherein each video stream comprises video focused on the upper body and torso of the service provider so as to include the service provider's head, shoulders, arms, hands, and eye contact of the service provider, wherein each service provider video clip has a duration of less than the predetermined period of time, wherein each service provider video clip comprises a service provider book button disposed on the upper right hand side of the video clip, wherein each service provider book button is configured to stop playing the service provider video clip when selected by the user;

wherein each service provider qualification section is disposed immediately beneath the corresponding service provider video clip, wherein each service provider qualification comprises at least one of an infographic area and an identification area:

wherein steps (a) to (c) are completed within the predetermined period of time.

2. The method of claim 1, wherein the service provider booking process further comprises (i) receiving, by the computer, a user selection to play a service provider video clip; (ii) receiving, by the computer, a user selection of a service provider book button corresponding to the user selected service provider video clip; and (iii) booking a service provider.

3. The method of claim 1, wherein the service provider candidate box has a candidate box width, wherein the service provider book button has a width no more than a quarter of the candidate box width.

4. The method of claim 1, wherein the predetermined period of time is 3 minutes.

5. The method of claim 1, wherein the predetermined period of time is 2 minutes.

6. The method of claim 1, wherein the predetermined period of time is 60 seconds.

7. The method of claim 6, wherein the coarse qualification process is completed within 30-60 seconds.

8. The method of claim 7, wherein the qualification refinement process is completed within 30-60 seconds.

9. The method of claim 8, wherein the service provider booking process is completed within 30-60 seconds.

10. The method of claim 9, wherein the infographic area comprises a graph, a bar, a logo, or any combination thereof.

11. The method of claim 9, wherein the infographic area comprises text no more than two words.

12. The method of claim 9, wherein the identification area comprises a service provider name, location, a time, or any combination thereof.

13. The method of claim 1, wherein the coarse qualification process is further configured to be completed within 30-60 seconds.

14. The method of claim 1, wherein the qualification refinement process is further configured to be completed within 30-60 seconds.

15. The method of claim 1, wherein the service provider booking process is further configured to be completed within 30-60 seconds.

16. The method of claim 1, where the service provider qualification section has a service provider qualification height, wherein the service provider video clip has a service provider video clip height, wherein the service provider qualification height is less than the service provider video clip height.

* * * * *